(12) United States Patent
Nagatomi et al.

(10) Patent No.: US 7,903,507 B2
(45) Date of Patent: Mar. 8, 2011

(54) OPTICAL PICKUP DEVICE AND METHOD OF LAYING OUT THE SAME

(75) Inventors: Kenji Nagatomi, Kaidu (JP); Seiji Kajiyama, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 1008 days.

(21) Appl. No.: 11/642,730

(22) Filed: Dec. 21, 2006

(65) Prior Publication Data

US 2007/0147198 A1 Jun. 28, 2007

(30) Foreign Application Priority Data

Dec. 27, 2005 (JP) ................. 2005-376247
Dec. 28, 2005 (JP) ................. 2005-377003

(51) Int. Cl.
G11B 7/00 (2006.01)
G11B 1/135 (2006.01)
(52) U.S. Cl. ................. 369/44.23; 369/112.01
(58) Field of Classification Search ............... None
See application file for complete search history.

(56) References Cited

U.S. PATENT DOCUMENTS

2003/0099184 A1* 5/2003 Liu et al. ............... 369/112.24
2004/0090901 A1* 5/2004 Katayama ............... 369/112.24

FOREIGN PATENT DOCUMENTS

| CN | 1269579 | 10/2000 |
|---|---|---|
| JP | 10-302304 | 11/1998 |
| JP | 11-175988 | 7/1999 |
| JP | 2000-090476 | 3/2000 |
| JP | 2001-101692 | 4/2001 |
| JP | 2004-158118 | 6/2004 |
| JP | 2006-031913 | 2/2006 |
| WO | WO 97/42631 | 11/1997 |

OTHER PUBLICATIONS

Japanese Office Action, with English translation, issued in Japanese Patent Application No. 2005-376247, mailed Apr. 14, 2009.
Japanese Office Action, with English translation, issued in Japanese Patent Application No. 2005-377003, mailed Apr. 14, 2009.
Chinese Office Action, with English translation, issued in Chinese Patent Application No. CN 200610172364.3, mailed Feb. 15, 2008.

* cited by examiner

*Primary Examiner* — Wayne R Young
*Assistant Examiner* — Carl Adams
(74) *Attorney, Agent, or Firm* — McDermott Will & Emery LLP

(57) ABSTRACT

An optical pickup device is provided, in which, supposing that an angle formed by the meeting of a straight line connecting a center of an optical disk and an accessing position of an HD objective lens with a diameter L of the optical disk is a track angle $\theta 1$, an oscillation angle $\alpha$ of an optical system including an HD laser, an HD half mirror, and an HD sensor, and a distance z of the HD objective lens are set so as to satisfy $\alpha - (\theta 1 max + \theta 1 min)/2 = \pm 45°$, where $\theta 1 max$ is the track angle $\theta 1$ when the HD objective lens is positioned at an innermost circumference of the optical disk, and $\theta 1 min$ is the track angle $\theta 1$ when the HD objective lens is positioned at an outermost circumference of the optical disk.

12 Claims, 17 Drawing Sheets

FOCUSING

TRACKING $\phi_{max} = \alpha - \theta_{1min}$

TRACKING $\phi_{min} = \alpha - \theta_{1max}$

TOP VIEW OF OPTICAL SYSTEM

SIDE VIEW OF OPTICAL SYSTEM (SCHEMATIC)

11 : HD LASER
12 : HD HALF MIRROR
13 : HD LAUNCHING MIRROR
14 : HD COLLIMATING LENS
15 : HD OBJECTIVE LENS
16 : HD SENSOR
21 : DVD LASER
22 : DVD DIFFRACTION GRATING
23 : DVD HALF MIRROR
24 : DVD LAUNCHING MIRROR
25 : DVD COLLIMATING LENS
26 : DVD OBJECTIVE LENS
27 : DVD SENSOR
30 : ACTUATOR MOVABLE UNIT
31 : OBJECTIVE LENS ACTUATOR
100 : DISK
200 : SPINDLE MOTOR

SENSOR PARAMETERS

DISK PARAMETERS

*TE SIGNAL GENERATION CIRCUIT*

*PUSH-PULL SIGNAL*

*FE SIGNAL GENERATION CIRCUIT*

*FE SIGNAL*

OPTICAL SYSTEM PARAMETER

OPTICAL SYSTEM PARAMETER

FIG. 8

OPTICAL SYSTEM PARAMETERS

| LASER | WAVELENGTH λ (nm) | 408 |
|---|---|---|
| HALF MIRROR | REFRACTIVE INDEX | 1.67 |
| | PLATE THICKNESS t (mm) | 1 |
| | INCLINATION a (°) | 45 |
| OBJECTIVE LENS | FOCAL LENGTH fo (mm) | 2.3 |
| | NUMERICAL APERTURES | 0.65 |
| COLLIMATING LENS | FOCAL LENGTH fc (mm) | 20.7 |

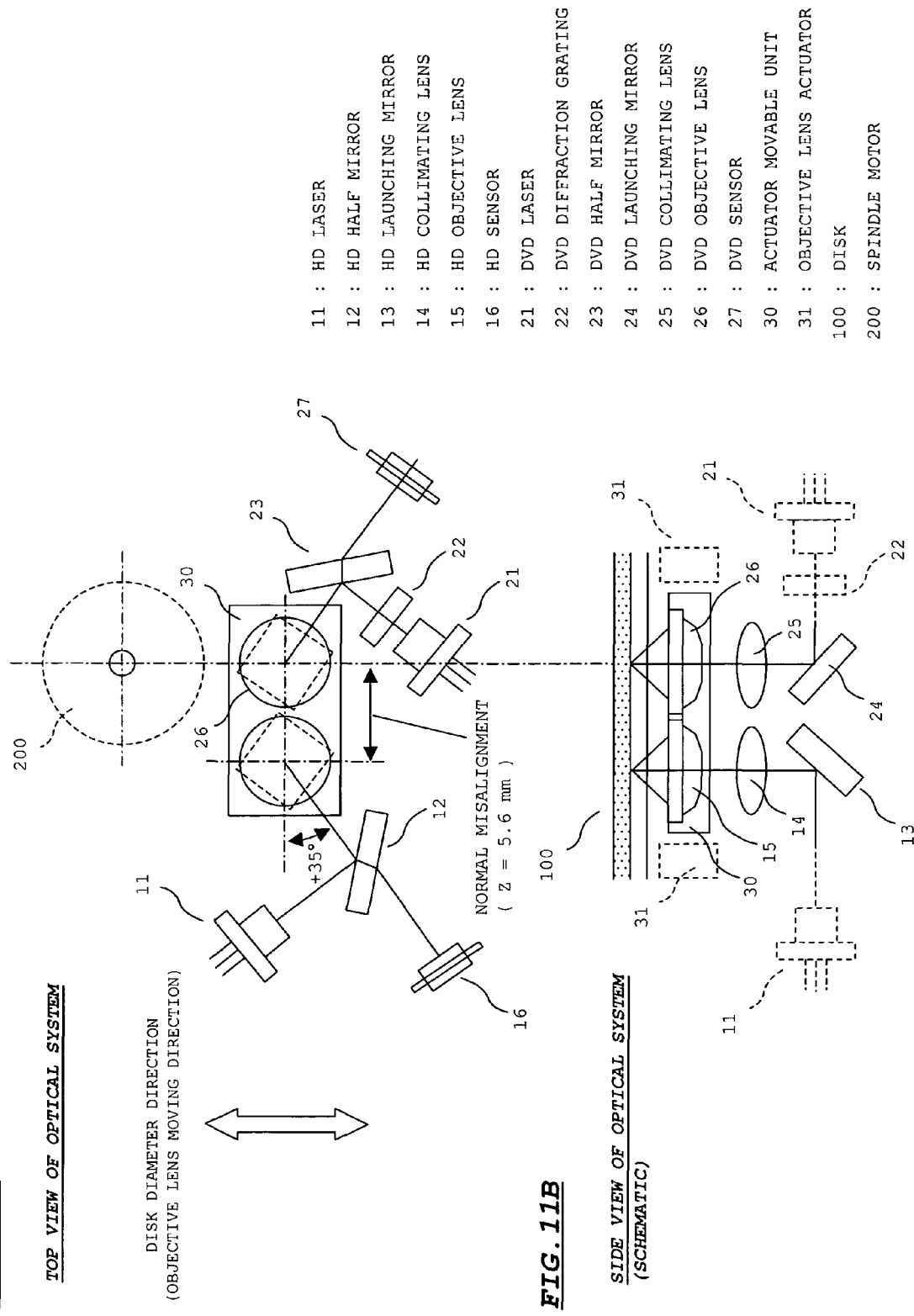

CHANGES IN NORMAL MISALIGNMENT AND TRACK ANGLE

NORMAL MISALIGNMENT AND TRACK ANGLE

OPTICAL PICKUP DEVICE AND METHOD OF LAYING OUT THE SAME

This application claims priority under 35 U.S.C. Section 119 of Japanese Patent Application No. 2005-376247 filed Dec. 27, 2005 and Japanese Patent Application No. 2005-377003 filed Dec. 28, 2005.

BACKGROUND OF THE INVENTION

1. Field of the Invention

The present invention relates to an optical pickup device and a method of laying out an optical system thereof, which is in particular suitable for use in a compatible optical pickup device capable of outputting laser light of a plurality of wavelengths as well as a method of laying out such a device.

2. Description of Related Art

With the growing size of optical disks in their capacity, development of HD-DVDs (High Definition Digital Versatile Discs) using blue wavelength laser light has been pursued. Presently, optical pickup devices compatible for both of such HD-DVDs and existing DVDs have been under development.

A typical configuration for such compatible optical pickup devices of this kind, as described in International Patent Publication No. WO97/42631, for example, may be such that separate objective lenses are positioned respectively for HD-DVD laser light and DVD laser light. In this configuration, the two objective lenses may be disposed side by side along a direction orthogonal to a direction of the disk diameter. In such a case, when one of the objective lenses moves along the disk diameter, the other objective lens moves along a line in parallel to and with a specific distance from the disk diameter. However, in this manner, the relation between the other objective lens and a track direction of the disk varies in accordance with the movement of the objective lenses, as described below.

FIGS. 16A and 16B show angles of the track direction at respective positions as the two objective lenses moves along the disk diameter.

In FIG. 16A, one of the two objective lenses moves along a line O-Y (amount of normal misalignment=0), while the other objective lens moves in parallel to the line O-Y with a distance z from the line O-Y (amount of normal misalignment=Z). At this time, supposing that an angle of the track direction is θ2 (an angle formed by the meeting of a tracking tangent with a line parallel to the OX line) in FIG. 16A, a relation between an amount of displacement in the objective lenses and a track angle is as shown in FIG. 16B. Note that, FIG. 16B shows an example when the amount of normal misalignment is 5 mm.

As shown in the drawings, if no normal misalignment occurs in the objective lenses, the track angle θ2 is always equal to zero regardless of the positions of the objective lenses. In contrast, if the normal misalignment occurs in the objective lenses, the track angle θ2 changes as the objective lenses move as also shown in the drawing. This change in the track angle θ2 also changes a direction of the track on a photodetector. This can cause such a problem that the track direction rotates with respect to a parting line of a sensor pattern, hindering generation of a proper push-pull signal.

Note that, in FIG. 16A, the track angle θ2 satisfies the relation of θ2=θ1. Accordingly, the track angle may also be represented as θ1.

The optical pickup devices of this type, as shown in FIG. 17, may adopt a configuration in which a half mirror in a plate shape is inserted into an optical system for which an oscillation angle α is provided, thereby introducing astigmatism to the laser light as a result of refracting effect of the half mirror. With this configuration, it is possible to make an optical system compact in size, and to reduce the number of components.

However, in this case, there is often a case in which the oscillation angle α may not be set to ±45° because of a laying out condition of optical components. In this case, the track direction on the photodetector does not align with a 45° direction with respect to a deformation direction of a beam spot due to the astigmatism. Consequently, a problem arises that a 4-split sensor may not be positioned at a position at which both a focus error signal and a tracking error signal (push-pull signal) become appropriate.

Specifically, if the 4-split sensor is positioned so that the parting line becomes 45° with respect to the deformation direction of the beam spot, the track direction on the sensor is inclined with respect to the parting line of the sensor pattern. In contrast, if the 4-split sensor is positioned so that the parting line of the sensor pattern is along the track direction, this parting line does not align with a 45° direction with respect to the deformation direction of the beam spot.

Moreover, as described above, if the normal misalignment occurs in the objective lenses, the relation between the deformation direction of the beam spot due to the astigmatism and the track direction may further grow worse, depending on the direction and the degree of the normal misalignment. In such a case, adjusting the parting line of the sensor pattern to be appropriate for detection of the astigmatism causes such problems that a proper push-pull signal may not be generated, and a smooth tracking control may not be performed.

SUMMARY OF THE INVENTION

An object of the present invention is to provide an optical pickup device capable of minimizing a misalignment between a direction of a parting line of a sensor pattern and a track direction, even if normal misalignment occurs in objective lenses as described above.

Further, an object of the present invention is to provide an optical pickup device capable of smoothly generating both a focus error signal and a tracking error signal as well as a method of laying out such an optical pickup device, even if a track direction on a photodetector does not align with a 45° direction with respect to the deformation direction of the beam spot, as described above.

A first aspect of the present invention relates to an optical pickup device that adjusts the normal misalignment Z and an oscillation angle α, thereby optimizing both the focus error signal and the tracking error signal.

The optical pickup device according to this aspect includes: a semiconductor laser; a first objective lens that converges laser light outputted from the semiconductor laser on to a disk, and that is disposed at a position away from a diameter L of the disk by a distance z on a plane parallel to a surface of the disk, the diameter L being parallel to a moving direction of said optical pickup device; a photodetector that receives the laser light reflected from the disk, and that includes a sensor pattern divided into four regions by two parting lines orthogonally intersecting to each other; and an optical member in a plate shape that reflects the laser light outputted from the semiconductor laser to direct the laser light toward the first objective lens, and that transmits the laser light reflected from the disk to direct the laser light toward the photodetector. In this optical pickup device, in a case in which an oscillation angle α is formed in the plane parallel to the disk surface by the meeting of an optical axis of the laser light reflected by the optical member and directed toward the first objective lens with a line orthogonal to the disk diameter L and parallel to the disk surface, the oscillation angle α and the distance z are adjusted so that a track direction of the disk on the photodetector is positioned at substantially 45° to a direction in which the optical member introduces astigmatism, and one of the two parting lines of the sensor pattern is aligned with a line positioned at substantially 45° to the astigmatism introducing direction.

In the optical pickup device according to the first aspect, supposing that an angle formed by the meeting of a straight line connecting a center of the disk and an accessing position of the first objective lens with the diameter L is a track angle $\theta1$, the oscillation angle α and the distance z may be set so as to satisfy: $\alpha-(\theta1max+\theta1min)/2=\pm45°$, where $\theta1max$ is the track angle $\theta1$ when the first objective lens is positioned at an innermost circumference of the disk, and $\theta1min$ is the track angle $\theta1$ when the first objective lens is positioned at an outermost circumference of the disk.

An embodiment of the present invention according to the first aspect is described hereinbelow as examples 1 and 2. The effects of the present invention according to the first aspect will further become apparent by verifications described in the examples 1 and 2.

A second aspect of the present invention relates to an optical pickup device that adjusts the direction of the parting line of a 4-split sensor that receives light reflected from a disk, thereby optimizing both the focus error signal and the tracking error signal.

The optical pickup device according to this aspect includes: a semiconductor laser; an objective lens that converges laser light from the semiconductor laser onto a disk, a photodetector that receives the laser light reflected from the disk, and that includes a sensor pattern divided into four regions by two parting lines orthogonally intersecting to each other; and an optical member in a plate shape that reflects the laser light outputted from the semiconductor laser to direct the laser light toward the objective lens, and that transmits the laser light reflected from the disk to direct the laser light toward the photodetector. In this optical pickup device, in a case in which a track direction of the disk on the photodetector is positioned at an angle other than 45° to a direction in which a beam spot is deformed due to an astigmatism effect by the optical member, the sensor pattern is positioned so that one of the two parting lines of the sensor pattern becomes closer to a second direction than a first direction, the first direction aligning with the track direction, the second direction being at 45° to the deformation direction of the beam spot.

A third aspect of the present invention relates a method of laying out the optical pickup device that adjusts the direction of the parting line of the 4-split sensor that receives the light reflected from a disk, thereby optimizing both the focus error signal and the tracking error signal.

The laying out method according to this aspect relates to a method of laying out an optical pickup device when the device is configured to generate a focus error signal based on an astigmatism method and a tracking error signal based on a push-pull method, and provided with a photodetector having a sensor pattern divided into four regions by two parting lines that orthogonally intersect to each other. The laying out method includes the step of, in a case in which a track direction of a recording medium projected onto the photodetector is positioned at an angle other than 45° to a direction in which a beam spot is deformed due to an astigmatism effect, positioning the sensor pattern so that so that one of the two parting lines of the sensor pattern becomes closer to a second direction than a first direction, the first direction aligning with the track direction, the second direction being at 45° to the deformation direction of the beam spot.

The embodiment of the present invention according to the second and third aspects is described hereinbelow as examples 3, 4, and 5. The effects of the present invention according to the second and third aspects will further become apparent by verifications described in the examples 3, 4, and 5.

BRIEF DESCRIPTION OF THE DRAWINGS

These and other objects and features of the present invention will become fully apparent from the following description of a specific embodiment thereof, with reference to the accompanying drawings, in which:

FIG. 8 is a view illustrating verification conditions in the example 1 of the present invention;

FIGS. 11A and 11B illustrate an optical system for an optical pickup according to an example 2 of the present invention;

DESCRIPTION OF THE PREFERRED EMBODIMENTS

The following describes an embodiment of the present invention with reference to the drawings. The present embodiment relates to a HD-DVD/DVD compatible optical pickup device to which the present invention is applied.

Figure 1:
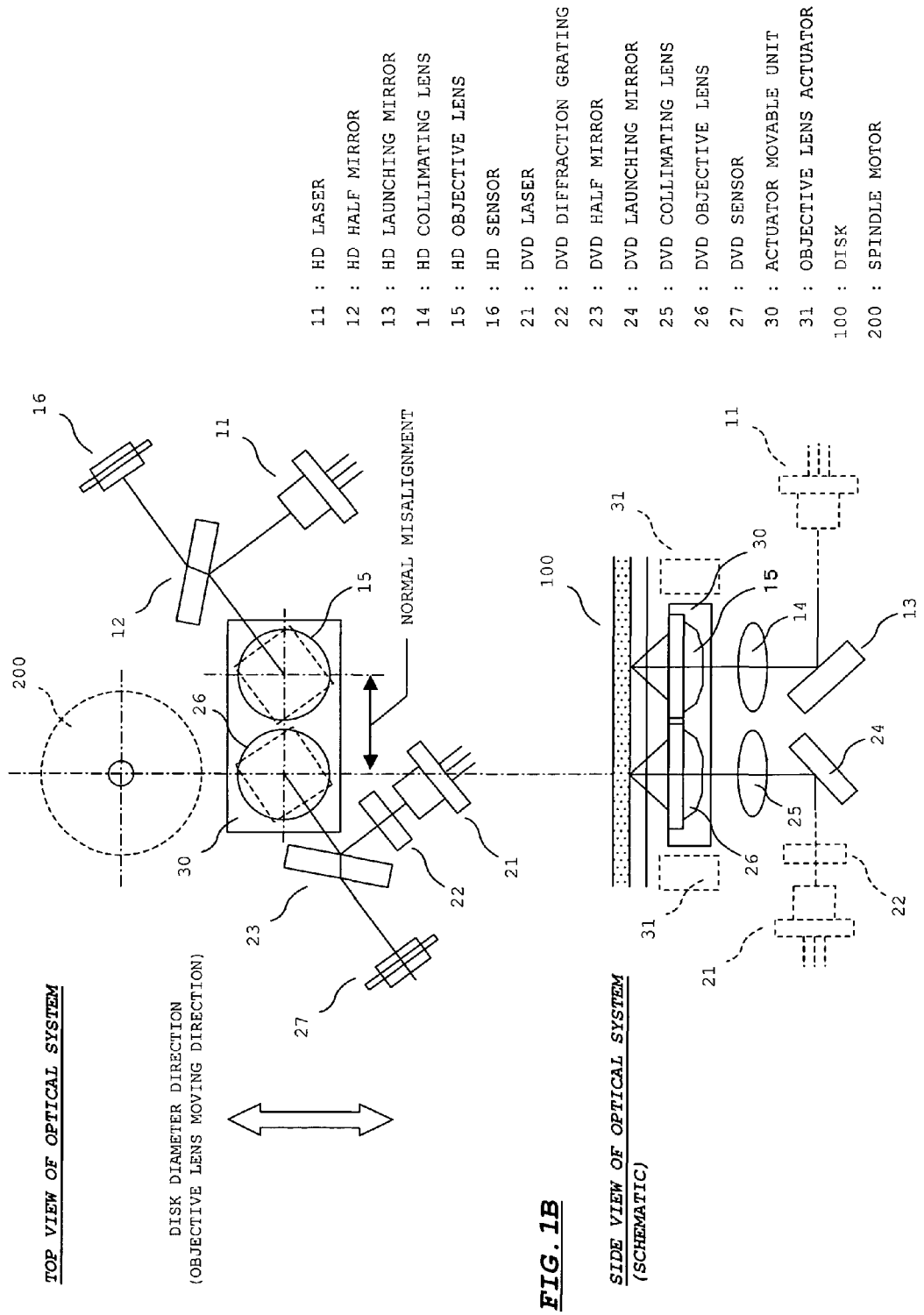
FIGS. 1A and 1B illustrate an optical system for an optical pickup according to one embodiment of the present invention.

FIGS. 1A and 1B illustrate a basic configuration of an optical system. For convenience sake, a spindle motor 200 is also shown in these figures. This optical system is divided into an optical system for illuminating an HD-DVD with laser light (HD optical system), and an optical system for illuminating a DVD with laser light (DVD optical system).

The HD optical system is configured by an HD laser 11, an HD half mirror 12, an HD launching mirror 13, an HD collimating lens 14, an HD objective lens 15, and an HD sensor 16.

The HD laser 11 outputs laser light in a blue wavelength of about 400 nm. The HD half mirror 12 reflects a portion of the laser light outputted from the HD laser 11 to the HD launching mirror 13, and transmits a portion of the laser light incident from the HD launching mirror 13 to direct toward the HD sensor 16.

Here, the HD half mirror 12 is formed from a plate shaped glass material having a constant thickness. The HD half mirror 12 has a half mirror surface formed on a plane facing toward the HD laser 11 and the HD launching mirror 13 out of two parallel planes of the glass material. The HD half mirror 12 is positioned so as to form a certain angle in a plane parallel to a disk surface with respect to an optical axis of the laser light incident from the HD launching mirror 13. Therefore, astigmatism is introduced, based on the refracting effect upon transmission through the HD half mirror 12, to the laser light that is transmitted through the HD half mirror 12 out of the laser light from the HD launching mirror 13. In the present embodiment, a focus error signal for an HD-DVD is generated based on the astigmatism method.

The HD launching mirror 13 reflects the laser light reflected from the HD half mirror 12 toward the HD collimating lens 14. The HD collimating lens 14 converts the laser light reflected from the HD launching mirror 13 into a collimated beam. The HD objective lens 15 converges the laser light from the HD collimating lens 14 onto a disk 100.

The HD sensor 16 receives the light transmitted through the HD half mirror 12 (reflection from the disk 100). This HD sensor 16 is provided with a sensor pattern divided into four regions by two orthogonally intersecting parting lines (4-split sensor) for generating a focus error signal using the astigmatism method and a tracking error signal using the one-beam push-pull method.

On the other hand, the DVD optical system is configured by a DVD laser 21, a DVD diffraction grating 22, a DVD half mirror 23, a DVD launching mirror 24, a DVD collimating lens 25, a DVD objective lens 26, and DVD sensor 27.

The DVD laser 21 outputs laser light in a red wavelength of about 650 nm. The DVD diffraction grating 22 divides the laser light from the DVD laser 21 into three beams. The DVD half mirror 23 reflects a portion of the laser light incident from the DVD diffraction grating 22 toward the DVD launching mirror 24, and transmits a portion of the laser light incident from the DVD launching mirror 24 to direct toward the DVD sensor 27.

Here, the DVD half mirror 23 is formed from a plate shaped glass material having a constant thickness. The HD half mirror 23 has a half mirror surface formed on a plane facing toward the DVD diffraction grating 22 and the DVD launching mirror 24 out of two parallel planes of the glass material. The DVD half mirror 23 is positioned so as to form a certain angle in a plane parallel to a disk surface with respect to an optical axis of the laser light incident from the DVD launching mirror 24. Therefore, astigmatism is introduced, based on the refracting effect upon transmission through the DVD half mirror 23, to the laser light that is transmitted through the DVD half mirror 23 toward the DVD sensor 27 out of the laser light from the DVD launching mirror 24. In the present embodiment, a focus error signal for a DVD is generated based on the astigmatism method.

The DVD launching mirror 24 reflects the laser light reflected from the DVD half mirror 23 toward the DVD collimating lens 25. The DVD collimating lens 25 converts the laser light reflected from the DVD launching mirror 24 into a collimated beam. The DVD objective lens 26 converges the laser light from the DVD collimating lens 25 onto the disk 100.

The DVD sensor 27 receives the light transmitted through the DVD half mirror 23 (reflection from the disk 100). This DVD sensor 27 is provided with sensor patterns for generating a focus error signal using the astigmatism method and a tracking error signal using the differential push-pull method. Specifically, the DVD sensor 27 is provided with a sensor pattern divided into four regions by two orthogonally intersecting parting lines (4-split sensor) for receiving the main beam, as well as two pairs of sensor patterns each divided into two regions for receiving two sub beams.

The HD objective lens 15 and the DVD objective lens 26 are mounted to a common actuator movable unit 30. These two objective lenses are mounted to the actuator movable unit 30 such that the HD objective lens 15 and the DVD objective lens 26 are aligned along a direction orthogonal to a disk diameter with a certain distance to each other. The actuator movable unit 30 is driven by an objective lens actuator 31 toward a track direction and a focusing direction. Therefore, by application of focus servo and tracking servo via the objective lens actuator 31 to one of the HD objective lens 15 and the DVD objective lens 26, the other objective lens is driven along with the controlled objective lens toward the focusing direction and the track direction. For the objective lens actuator 31, a known configuration may be employed.

Figure 2:
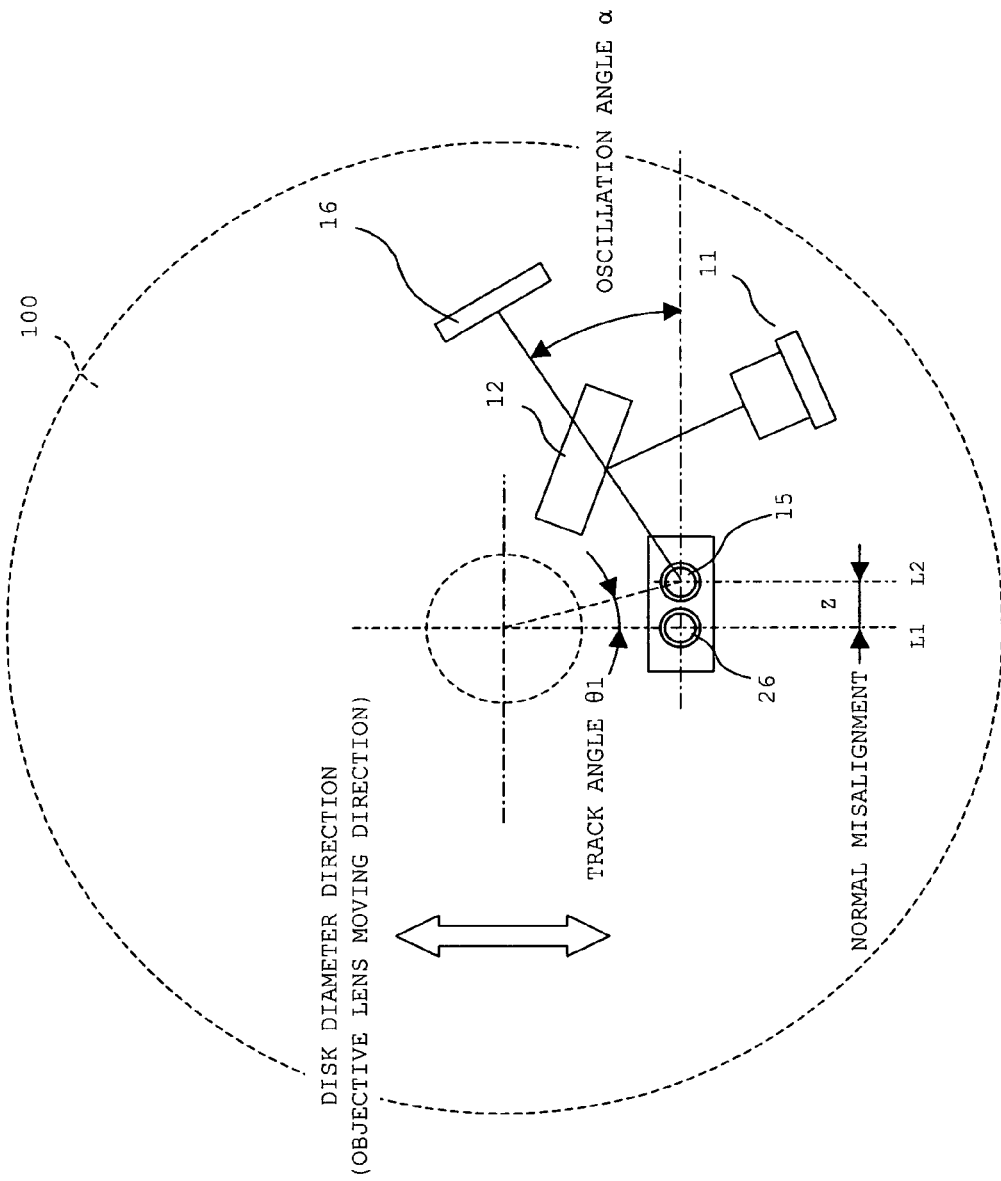
FIG. 2 illustrates relation between objective lenses and a disk according to the embodiment of the present invention.

FIG. 2 illustrates the relation between the objective lenses and the disk. AS described above, in the present embodiment, the DVD objective lens 26 out of the two objective lenses is positioned to move along the disk diameter (shown by an alternate long and short dash line L1 in the drawing). Accordingly, the HD objective lens 15 moves along a line that is displaced from the disk diameter L1 by the certain distance (shown by an alternate long and short dash line L2 in the drawing).

Figure 3A:
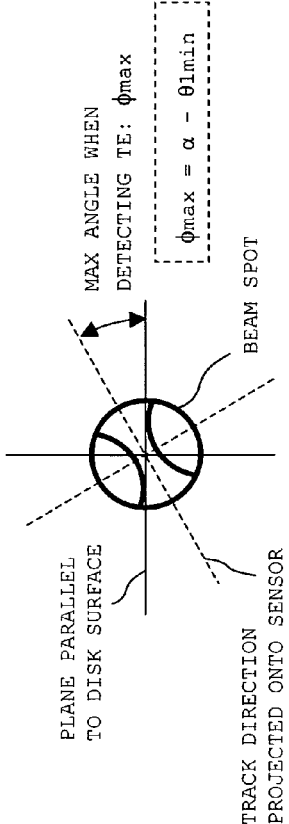
FIGS. 3A to 3C each illustrate a status of a beam spot on an HD sensor according to the embodiment of the present invention.
Figure 3B:
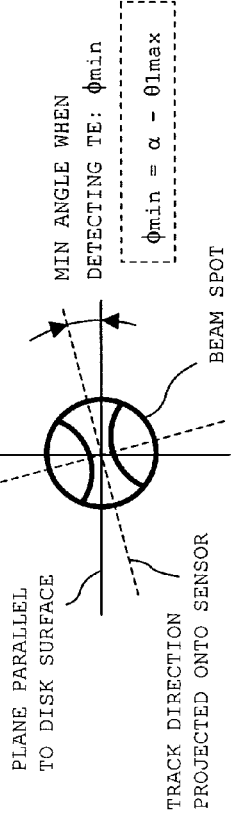
Figure 3C:
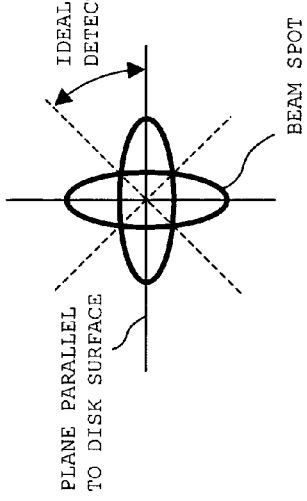

FIGS. 3A, 3B, and 3C are views each illustrating a status of a beam spot on the HD sensor 16.

Referring to FIG. 3A, when a focus error occurs in the HD objective lens 15, the beam spot on the HD sensor 16 deforms in directions parallel and perpendicular to the disk surface due to an astigmatism effect of the HD half mirror 12. Accordingly, by setting an angle $\psi$ formed by the meeting of one of the parting lines of the 4-split sensor provided for the HD sensor 16 with a plane parallel to a disk surface to $\psi = 45°$ as shown in the drawing, it is possible to properly perform focus error detection based on the astigmatism method.

Referring to FIG. 3B, an angle $\phi$ formed by the meeting of the track direction projected onto the beam spot on the HD sensor 16 with the plane parallel to the disk surface becomes maximum, when a track angle $\theta 1$ shown in FIG. 2 becomes minimum ($\theta 1 \min$), that is, when the HD objective lens 15 is positioned at an outermost circumference of the disk. Supposing that the angle $\phi$ at this time is $\phi \max$, $\phi \max$ is given by an equation below.

$$\phi \max = \alpha - \theta 1 \min \qquad (1)$$

Similarly, as shown in FIG. 3C, the angle becomes minimum, when the track angle $\theta 1$ becomes maximum ($\theta 1 \max$), that is, when the HD objective lens 15 is positioned at an innermost circumference of the disk. Supposing that the angle $\phi$ at this time is $\phi \min$, $\phi \min$ is given by an equation below.

$$\phi \min = \alpha - \theta 1 \max \qquad (2)$$

In this manner, the angle φ between the track direction and the plane parallel to the disk surface varies in a range of φmin≦φ≦φmax, while the HD objective lens 15 moves from the innermost circumference to the outermost circumference of the disk.

In order to properly generate the tracking error signal (push-pull signal), the track direction may be aligned with one parting line of the 4-split sensor. Thus, as shown in FIG. 3A, when the angle ψ between the one parting line of the 4-split sensor and the plane parallel to the disk surface is set to ψ=45° in order to properly perform the focus error detection, it is possible to properly generate the tracking error signal (push-pull signal) by setting the angle φ between the track direction and the plane parallel to the disk surface to φ=±45°.

However, as described above, the angle φ varies in a range of φmin≦φ≦φmax along with the movement of the HD objective lens 15. Accordingly, it is not possible to set the angle φ to φ=±45° at an arbitrary position of the objective lens.

In this case, setting φmin=±45° increases a displacement angle of the track direction to the parting line of the 4-split sensor when the HD objective lens 15 moves to the outermost circumferential position, thereby causing deterioration in properties of the tracking servo. In contrast, setting φmax=±45° increases the displacement angle of the track direction to the parting line of the 4-split sensor when the HD objective lens 15 moves to the innermost circumferential position, thereby causing deterioration in the properties of the tracking servo.

Compared to these cases, matching an intermediate angle φave between φmin and φmax, that is, $$\phi ave=\alpha-(\theta 1max+\theta 1min)/2 \quad (3)$$

with ψ=45° reduces the displacement angle of the track direction to the parting line of the 4-split sensor when the HD objective lens 15 moves to either the innermost circumferential position or the outermost circumferential position. Therefore, by setting φave=±45°, it is possible to suppress deterioration in the properties of the tracking servo.

As described above, setting φave=±45° facilitates the focus error detection based on the astigmatism method and the tracking error detection based on the one-beam push-pull method. In other words, the optical system shown in FIGS. 1A and 1B may obtain a proper focus error signal and a proper tracking error signal when the following condition is satisfied.

$$\phi ave=\alpha-(\theta 1max+\theta 1min)/2=\pm 45° \quad (4)$$

Therefore, it is possible to achieve the optical system capable of obtaining the proper focus error signal and the proper tracking error signal by setting an oscillation angle α and the track angles θ1max and θ1min so as to satisfy the above equation (4). Here, the track angles θ1max and θ1min may be adjusted with an amount of normal misalignment Z of the HD objective lens 15. Thus, by adjusting the position of the HD optical system such that the oscillation angle α and the normal misalignment Z satisfies the equation (4), the proper focus error signal and the proper tracking error signal may be obtained.

The following describes specific examples of a configuration for setting the oscillation angle α and the track angles θ1max and θ1min (amount of normal misalignment Z), for the optical system of FIGS. 1A and 1B.

EXAMPLE 1

This example relates to the optical system shown in the above FIGS. 1A and 1B, in which a proper value for the oscillation angle α when the amount of the normal misalignment z for the HD objective lens 15 is fixed to Z=5 mm is obtained, and the position of the HD optical system is positioned according to the obtained oscillation angle. In this example, the HD objective lens 15 is positioned on the right side of the DVD objective lens 26 like in the case of the optical system shown in FIGS. 1A and 1B.

Figure 16B:
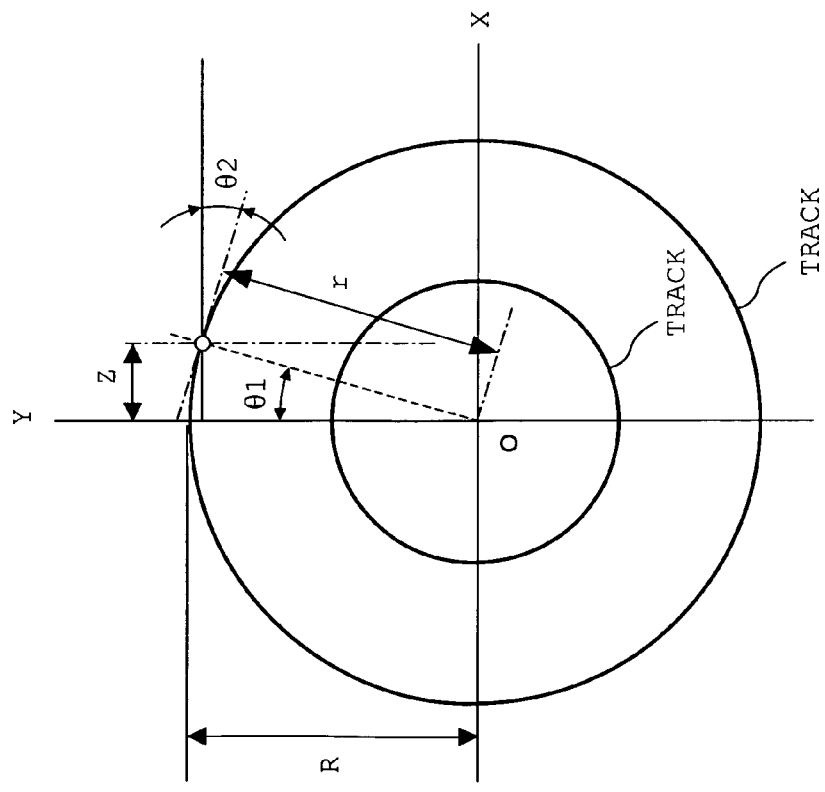
FIGS. 16A and 16B are views illustrating a problem when normal misalignment occurs in objective lens.
Figure 16A:
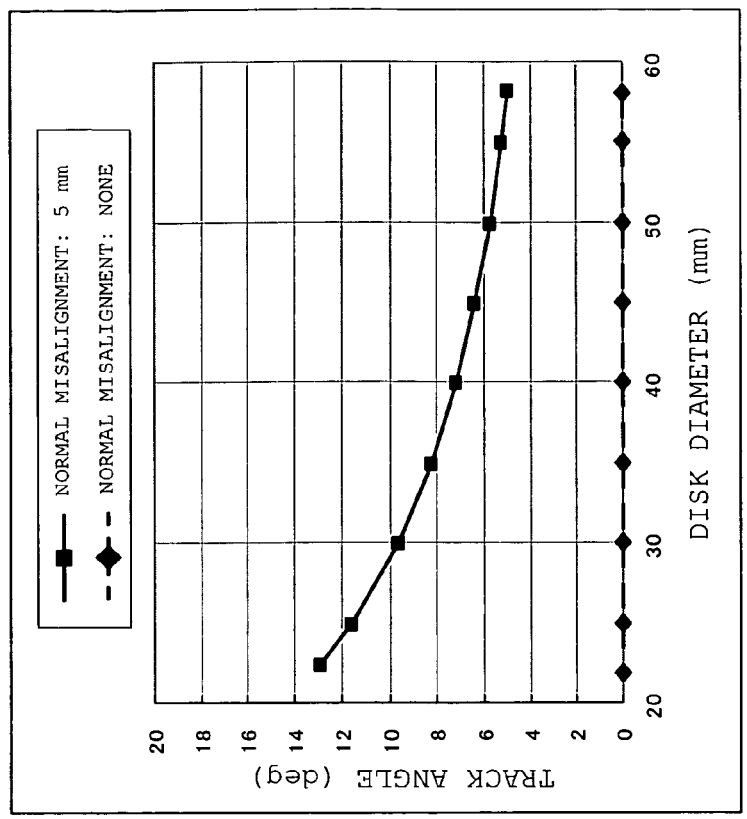
Figure 17:
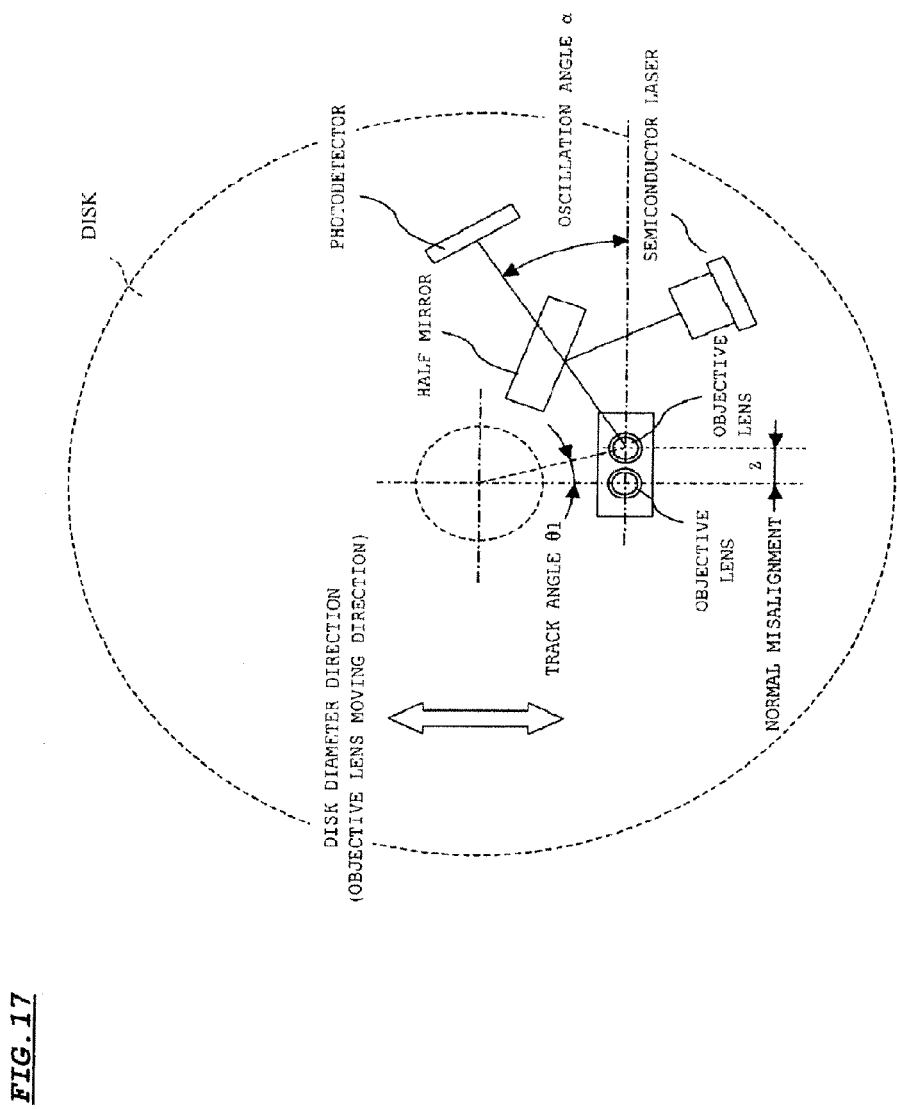
FIG. 17 illustrates an example of a configuration of an optical system for an optical pickup.

When the amount of the normal misalignment z for the HD objective lens 15 is 5 mm, referring to FIG. 16B, the maximum value θ1max and the minimum value θ1min for the track angle θ1 are respectively maximum value θ1max=13° and minimum value θ1min=5°. The oscillation angle α obtained by substituting these values to the above equation (4) is α=+54° and α=−36°.

Therefore, according to this example, the HD laser 11, the half mirror 12, and the HD sensor 16 are positioned so that the oscillation angle α becomes either +54° or −36° as shown in FIG. 2. Further, a sensor surface of the HD sensor 16 is adjusted so that the angle ψ between one parting line of the 4-split sensor provided for the HD sensor 16 and the plane parallel to the disk surface becomes ψ=45°.

Figures 4A, 4B:
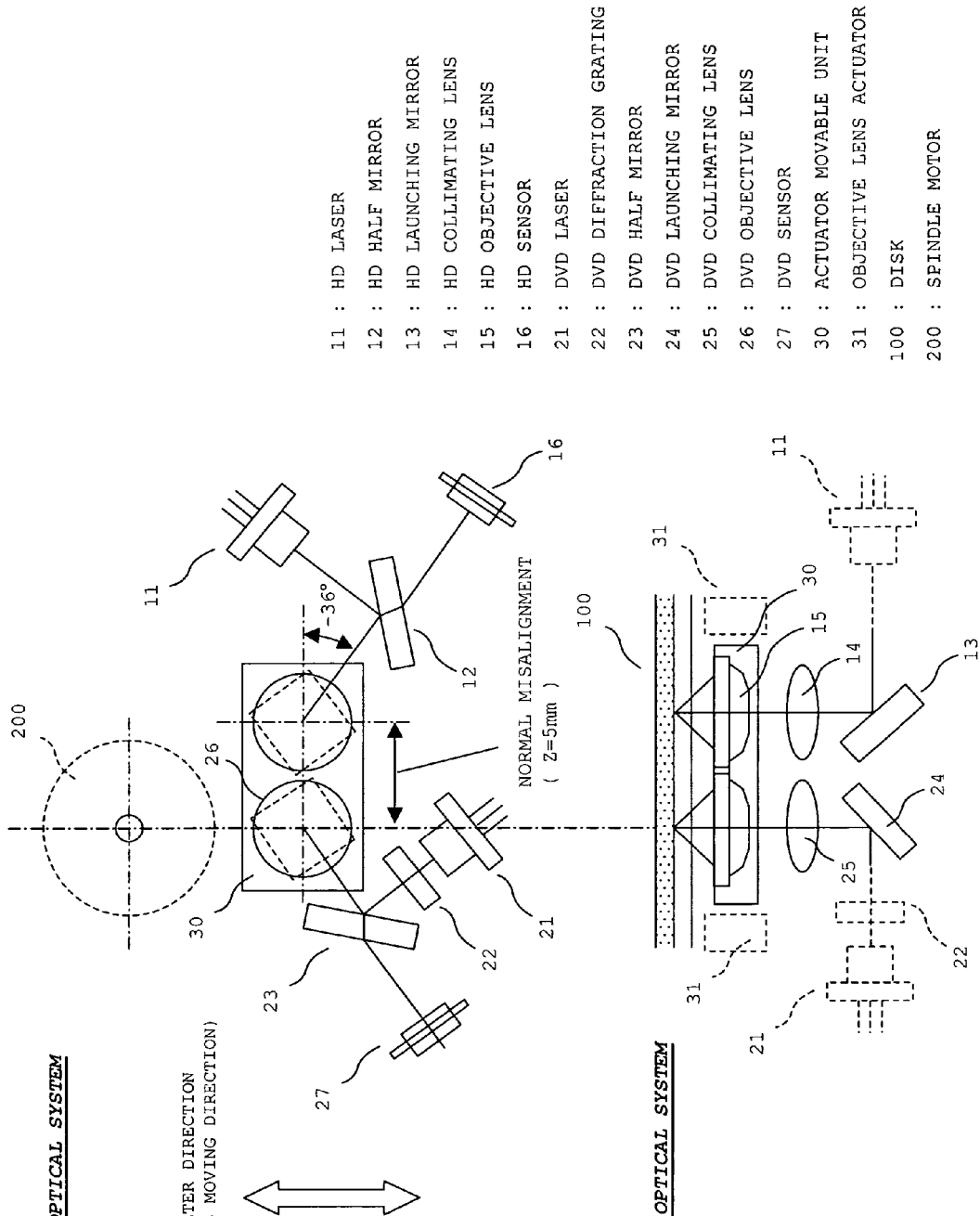
FIGS. 4A and 4B illustrate an optical system for an optical pickup according to an example 1 of the present invention.

When limiting the oscillation angle α to a range of −45°≦α≦+45° in order to make the optical system compact in size and to achieve other features, the oscillation angle α is set to −36°. In this case, the optical system is configured as shown in FIGS. 4A and 4B.

The following describes an verification example (simulation) for the focus error signal and the tracking error signal generated when taking −36° as the oscillation angle α.

First, setting conditions (setting values for parameters) in this verification example are explained.

Figure 5B:
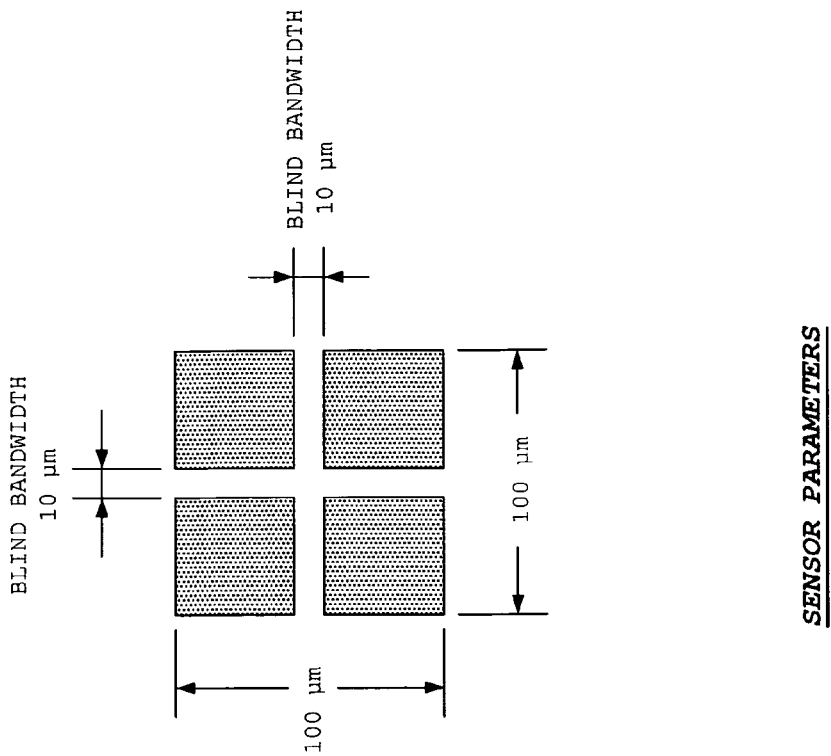
FIGS. 5A and 5B are views illustrating verification conditions in the example 1 of the present invention.
Figure 5A:
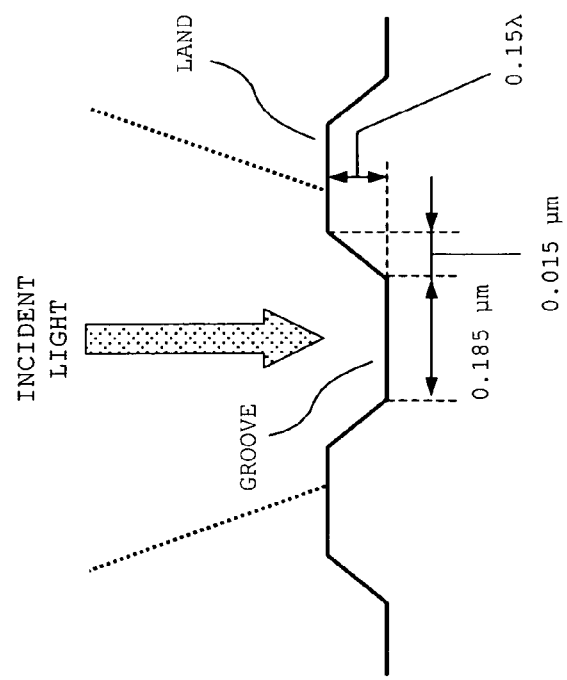

FIGS. 5A and 5B show parameter values for the disk 100 in this verification and parameter values for the HD sensor 16.

Figure 6A:
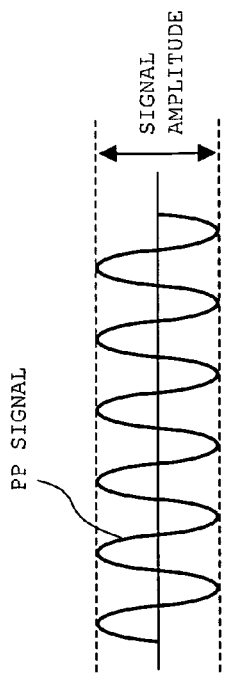
FIGS. 6A to 6D are views illustrating verification conditions in the example 1 of the present invention.
Figure 6B:
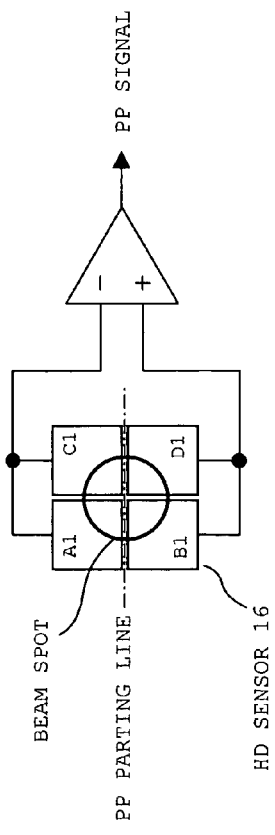

FIG. 6A shows a generation circuit of the tracking error signal (push-pull signal) in this verification. In this configuration, when the tracking servo is turned off while the disk rotates, the push-pull signal shown in FIG. 6B is generated.

Figure 6C:
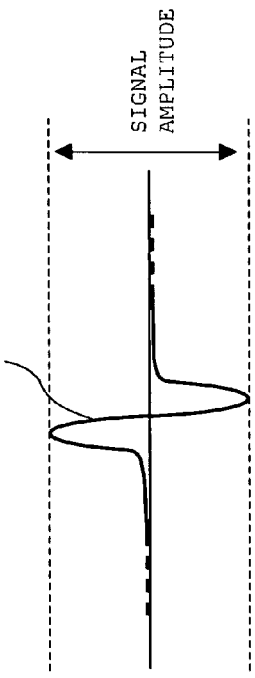

FIG. 6C shows a generation circuit of the focus error signal (push-pull signal) in this verification. In this configuration, when the HD objective lens 15 is displaced toward the focus direction, the focus error signal shown in FIG. 6D is generated.

Figure 7A:
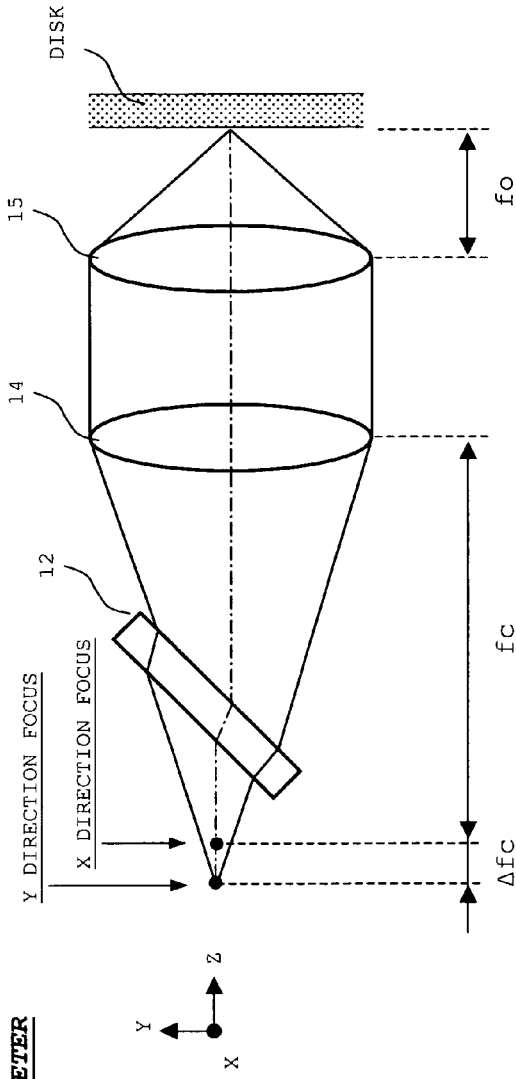
FIGS. 7A and 7B are views illustrating verification conditions in the example 1 of the present invention.
Figure 7B:
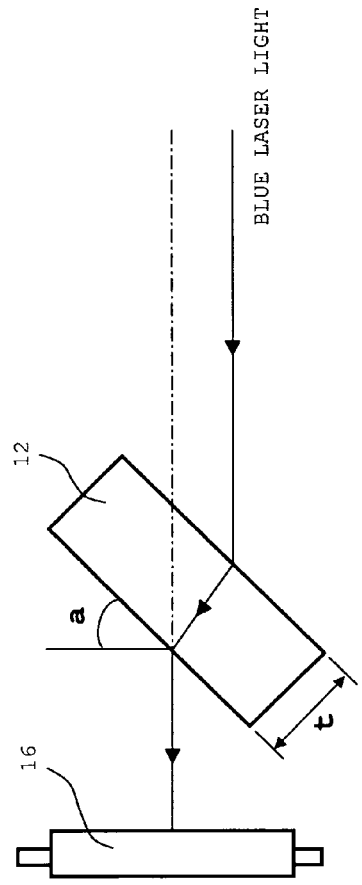

FIGS. 7A and 7B show various parameter values for the HD optical system in this verification. In this verification, the various parameters shown in the drawing are set respectively to values as shown in FIG. 8.

Figure 9A:
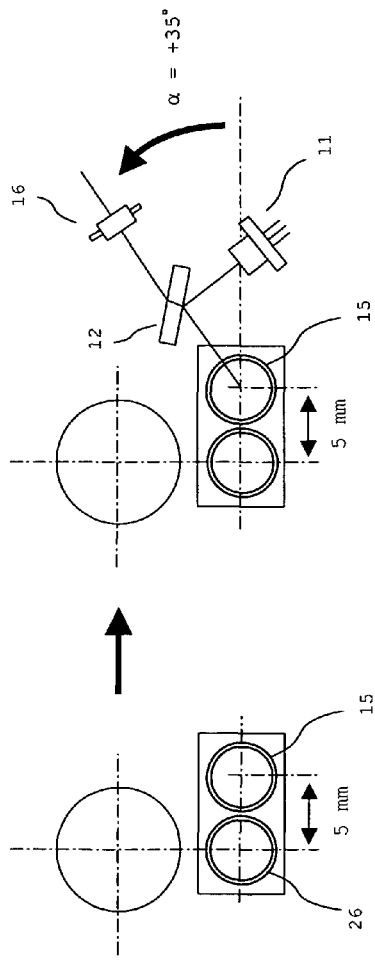
FIG. 9 is a view illustrating verification results of a comparative example in the example 1 of the present invention.
Figure 9B:
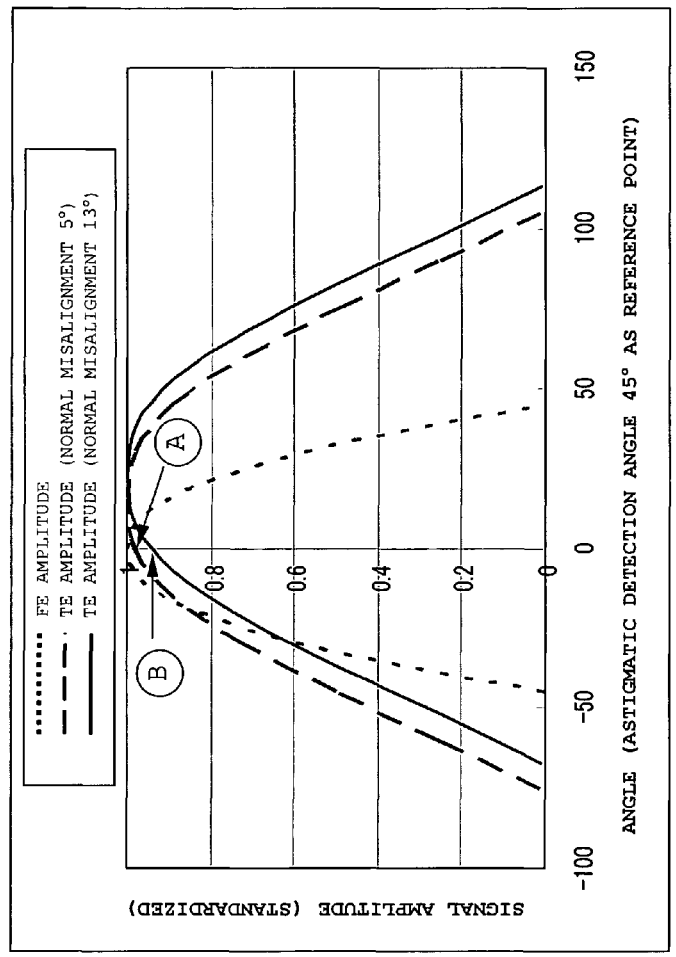

FIGS. 9A and 9B respectively show an HD optical system as a comparative example in this verification and simulation results of this HD optical system. As shown in FIG. 9A, the oscillation angle α is set to +35° in this comparative example. In the comparative example, the amount of the normal misalignment z for the HD objective lens 15 is set to 5 mm as in the example. Further, verification results shown at the bottom of the drawing shows the results of the simulation of a signal amplitude of the focus error signal (FE amplitude) and a signal amplitude of the tracking error signal (push-pull signal) (TE amplitude), when rotating a PP parting line shown in FIGS. 6A and 6C out of the parting lines of the 4-split sensor in directions moving closer to and away from the plane parallel to the disk surface, taking ψ=45° shown in FIG. 3A as a reference position.

Figure 6D:
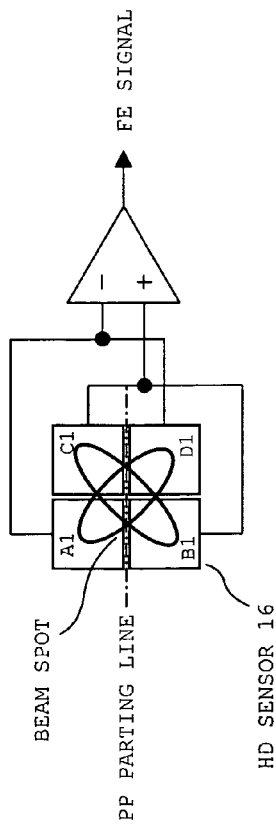

The vertical axis shown in FIG. 9B represents standardized signal amplitude shown in FIGS. 6B and 6D. The horizontal axis represents a rotational angle when the PP parting line shown in FIGS. 6A and 6B rotates taking ψ=45° shown in FIG. 3A as a reference position (angle=0°). Here, it is supposed that a direction in which the PP parting line rotates closer to the plane parallel to the disk surface from the reference position in FIG. 3A is positive, and a direction in which the PP parting line rotates away from the plane parallel is negative.

A dashed line indicating the TE amplitude in FIG. 9B represents the TE amplitude when the track angle $\theta1$ of the HD objective lens 15 takes minimum value $\theta1\min=5°$ (i.e. when the HD objective lens 15 is positioned at the outermost circumference). Further, a solid line indicating the TE amplitude represents the TE amplitude when the track angle $\theta1$ of the HD objective lens 15 takes maximum value $\theta1\max=13°$ (i.e. when the HD objective lens 15 is positioned at the innermost circumference).

It can be seen from the above results of the simulation that the TE amplitude when the track angle $\theta1$ is at maximum value $\theta1\max=13°$ (see the position pointed by an arrow B in FIG. 9B) deteriorates in the case in which the PP parting line of the HD sensor 16 is set at the position $\psi=45°$ so that the focus error signal becomes ideal. In other words, it is shown that the tracking error signal deteriorates when the HD objective lens 15 is positioned in vicinity of the innermost circumferential position.

Moreover, it can be seen that, when the PP parting line of the HD sensor 16 is set at the position $\psi=45°$ so that the focus error signal becomes ideal, the TE amplitude varies in a range from a position of an arrow A to a position of the arrow B in FIG. 9B as the track angle $\theta1$ varies from minimum value $\theta1\min=5°$ to maximum value $\theta1\max=13°$. In other words, as the HD objective lens 15 moves from the outermost circumferential position to the innermost circumferential position, the amplitude of the tracking error signal varies to a large extent. When the TE amplitude varies to a large extent according to the position of the HD objective lens 15 in this manner, a stable tracking servo is disturbed.

Figures 10A, 10B:
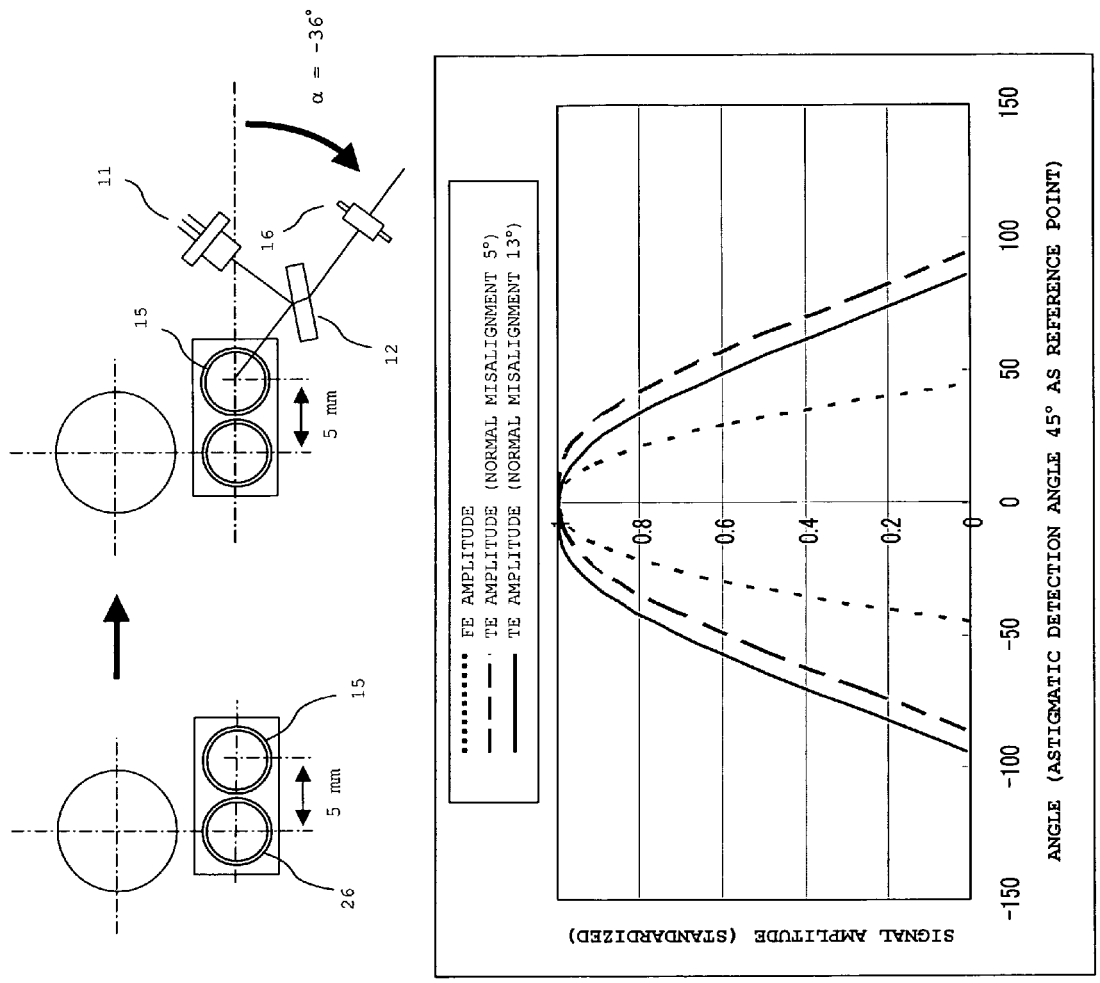
FIG. 10 is a view illustrating verification results in the example 1 of the present invention.

FIGS. 10A and 10B shows results of the verification in this example. In this example, as described above, the oscillation angle $\alpha$ is set to $-36°$. In addition, the amount of the normal misalignment z for the HD objective lens 15 is 5 mm. The vertical axis and the horizontal axis in the verification results shown in the bottom represent the same as in described for the above comparative example.

It can be seen from the above results of the simulation that, in the case in which the PP parting line of the HD sensor 16 is set at the position $\psi=45°$ so that the focus error signal becomes ideal, the obtained TE amplitude becomes substantially ideal when the track angle $\theta1$ is both at maximum value $\theta1\max=13°$ and at minimum value $\theta1\min$ alike. In other words, it is shown that an ideal tracking error signal may be obtained regardless of the position of the HD objective lens 15 in the range from the innermost circumferential position to the outermost circumferential position.

Further, in this case, even if the track angle $\theta1$ varies from minimum value $\theta1\min=5°$ to maximum value $\theta1\max=13°$, the TE amplitude may not vary to a large extent as observed in the comparative example. According to this example, the tracking error signal may be generated without amplitude variation even when the HD objective lens 15 moves from the outermost circumferential position to the innermost circumferential position. Thus, according to this example, it is possible to achieve the stable tracking servo.

As described above, according to this example, setting the PP parting line of the HD sensor 16 at the position of $\psi=45°$ makes both the focus error signal and the tracking error signal ideal without deterioration. Moreover, even when the track angle $\theta1$ changes as the HD objective lens 15 moves, it is possible to maintain the amplitude of the tracking error signal substantially constant in vicinity of the maximum amplitude.

Thus, according to this example, it is possible to achieve the stable focus servo and the stable tracking servo.

EXAMPLE 2

This example relates to the optical system shown in the above FIGS. 1A and 1B, in which a proper value for the amount of the normal misalignment z for the HD objective lens 15 when the oscillation angle $\alpha$ is filed to $-35°$ is obtained, and the position of the HD optical system is positioned according to the obtained amount of normal misalignment z. Note that in this example, the HD objective lens 15 is positioned on the left side of the DVD objective lens 26 unlike the optical system shown FIGS. 1A and 1B.

When the oscillation angle $\alpha$ of the HD objective lens 15 is $+35°$, from the equation (4), the maximum value $\theta1\max$ and the minimum value $\theta1\min$ of the track angle $\theta1$ are required to satisfy the following relation.

$$(\theta1\max+\theta1\min)/2=-10°,+80° \qquad (5)$$

Here, $(\theta1\max+\theta1\min)/2=+80°$ is impossible. Consequently, the relation between the maximum value $\theta1\max$ and the minimum value $\theta1\min$ is defined as follows.

$$(\theta1\max+\theta1\min)/2=-10° \qquad (6)$$

Figure 13:
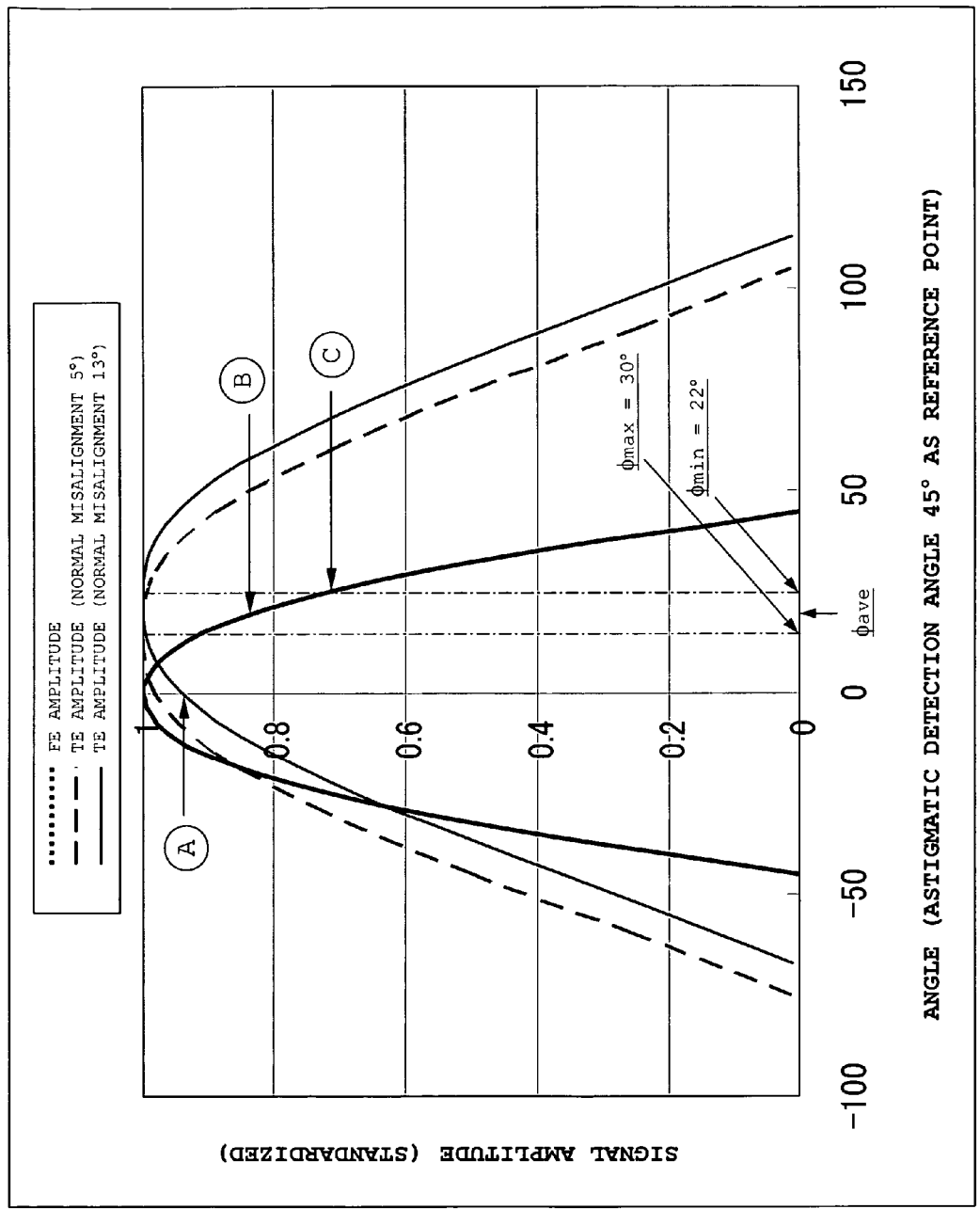
FIG. 13 is a view illustrating verification results in an example 3 of the present invention.

Referring to FIG. 13, $\theta=\sin^{-1}(Z/r)$ (r is a distance from a center of the disk to a position on the diameter of the HD objective lens). Therefore, $\theta1\max$ corresponding to $r\min=21.9$ mm and $\theta1\min$ corresponding to $r\max=58.0$ mm are $\theta1\min=-14.3°$ and $\theta1\max=-5.5°$, respectively, when the normal misalignment $Z=5.6$ mm. In this case, the following relation is established, thereby substantially satisfying the relation of the above equation (6).

$$(\theta1\max+\theta1\min)/2=-9.9° \qquad (7)$$

Therefore, according to this example, the HD objective lens 15 is positioned on the left side of the DVD objective lens 26 so that the amount of the normal misalignment $z=5.6$ mm. In this case, the optical system is configured as shown in FIGS. 11A and 11B.

Figure 12A:
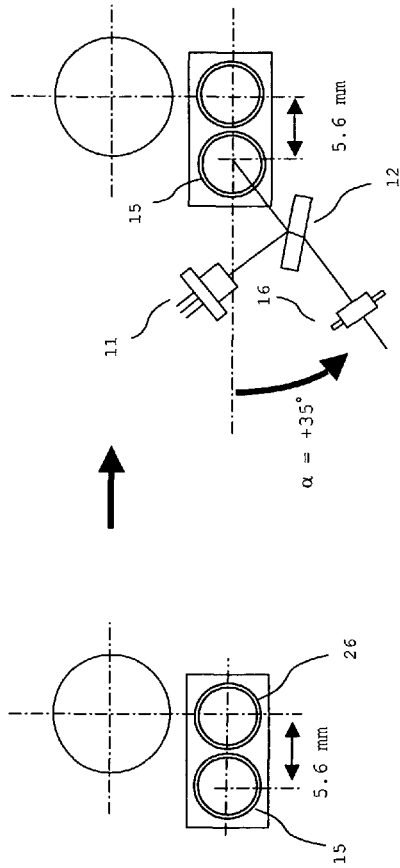
FIG. 12 is a view illustrating verification results in the example 2 of the present invention.
Figure 12B:
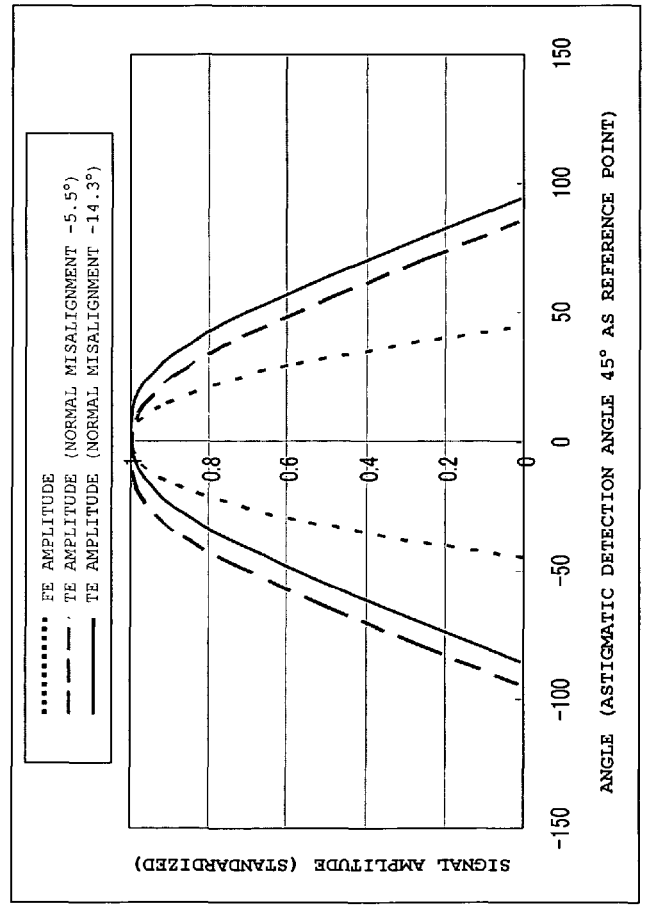

FIGS. 12A and 12B respectively illustrate the optical system configured according to this example and an verification example (simulation) for the focus error signal and the tracking error signal generated in this case. The setting conditions and the vertical and the horizontal axes shown in FIG. 12B for results of the verification are the same as in the case of the verification described in the above Example 1.

It can be seen from the above results of the simulation shown in FIG. 12B that, in the case in which the PP parting line of the HD sensor 16 is set at the position $\psi=45°$ so that the focus error signal becomes ideal, the obtained TE amplitude becomes substantially ideal when the track angle $\theta1$ is both at maximum value $\theta1\max$ and at minimum value $\theta1\min$ alike. In other words, it is shown that an ideal tracking error signal may be obtained regardless of the position of the HD objective lens 15 in the range from the innermost circumferential position to the outermost circumferential position.

Further, in this case, even if the track angle $\theta1$ varies from maximum value $\theta1\max=-5.5°$ to minimum value $\theta1\min=-14.3°$, the TE amplitude may not vary to a large extent as observed in the comparative example in the Example 1. According to this example, the tracking error signal may be generated without amplitude variation even when the HD objective lens 15 moves from the outermost circumferential position to the innermost circumferential position. Thus, according to this example, it is possible to achieve the stable tracking servo, as in the case of the Example 1.

As described above, according to this example, as in the Example 1, setting the PP parting line of the HD sensor 16 at the position of $\psi=45°$ makes both the focus error signal and the tracking error signal ideal without deterioration. Moreover, even when the track angle $\theta 1$ changes as the HD objective lens 15 moves, it is possible to maintain the amplitude of the tracking error signal substantially constant in vicinity of the maximum amplitude. Thus, according to this example, it is possible to achieve the stable focus servo and the stable tracking servo.

EXAMPLE 3

In the Examples 1 and 2, the oscillation angle $\alpha$ and the amount of the normal misalignment z are adjusted so that the intermediate angle $\phi ave$ between $\phi min$ and $\phi max$ matches with $\psi=45°$, thereby making both the focus error signal and the tracking error signal ideal without deterioration. In other words, in these Examples, it is intended to improve the focus error signal and the tracking error signal by adjusting the positioning of the HD optical system so that the oscillation angle $\alpha$ and the amount of the normal misalignment z satisfies the equation (4).

In contrast, this example intends to improve the focus error signal and the tracking error signal by adjusting the direction of the PP parting line shown in FIGS. 6A and 6B. Specifically, it is intended to improve the focus error signal and the tracking error signal by adjusting the direction of the parting line of the 4-split sensor in a case in which $\psi=45°$ shown in FIG. 3A and $\phi ave$ from the equation (3) do not match each other. This example is effective in such a case in which the oscillation angle $\alpha$ and the amount of the normal misalignment z are both fixed in advance because of design limitations of the optical system, and thus the method described in the Examples 1 and 2, i.e., adjusting the oscillation angle $\alpha$ and the amount of the normal misalignment z to match $\psi=45°$ and $\phi ave$ cannot be adopted.

In this manner, when $\psi=45°$ and $\phi ave$ do not match each other, the direction of the parting line of the 4-split sensor may typically be adjusted in a range from a position of $\psi=45°$ to a position of $\phi ave$. At this time, as the direction of the parting line becomes closer to the position of $\psi=45°$, the focus error signal is improved more while the tracking error signal deteriorates. On the other hand, as the direction of the parting line becomes close to the position of $\phi ave$, the tracking error signal is improved more while the focus error signal deteriorates.

The inventor of the present invention has examined appropriate setting for the parting line of the 4-split sensor, from the position of $\psi=45°$ to the position of $\phi ave$, when $\psi=45°$ and $\phi ave$ do not match as described here. At this time, degrees of the deterioration of the focus error signal and the tracking error signal when the parting line of the 4-split sensor is displaced from the position of $\phi=45°$ or from the position of $\phi ave$ are considered as follows.

As shown in FIG. 3A, in a case in which the astigmatism is introduced to the laser light, the beam spot on the photodetector deforms in two directions orthogonal to each other. Accordingly, when the 4-split sensor is rotated about the straight line penetrating the center of the beam spot as the axis, the amplitude (Peak-to-Peak) of the focus error signal (the astigmatism method) varies with a rotation period of 90°.

At the same time, in a case in which the tracking error signal is generated according to the push-pull method, when the 4-split sensor is rotated about a straight line penetrating the center of the beam spot as an axis as in the above case, the amplitude (Peak-to-Peak) of the tracking error signal varies with a rotation period of 180°. In other words, the amplitude period of the tracking error signal becomes twice as long as the amplitude period of the focus error signal.

Therefore, the degree of the deterioration when the parting line of the 4-split sensor is displaced from an ideal position becomes much greater in the focus error signal than in the tracking error signal. Accordingly, when $\psi=45°$ and $\phi ave$ do not match, the deterioration in the focus error signal and the tracking error signal may be suppressed more effectively by positioning the parting line of the 4-split sensor closer to the position of $\psi=45°$ than the position of $\phi ave$.

The following describes a specific example, for the optical system of FIGS. 1A and 1B, of an adjustment of the 4-split sensor, when the oscillation angle $\alpha$ and the track angles $\theta 1max$ and $\theta 1min$ (normal misalignment Z) are set to predetermined values.

Example of Specific Adjustment

This example of adjustment intends to, in the optical system shown in the above FIGS. 1A and 1B, adjust the positioning of the 4-split sensor to the proper value when the normal misalignment Z of the HD objective lens 15 is set to Z=5 mm, and the oscillation angle $\alpha$ is set to $\alpha=+35°$.

When the amount of the normal misalignment z for the HD objective lens 15 is 5 mm, referring to FIG. 16B, the maximum value $\theta 1max$ and the minimum value $\theta 1min$ for the track angle $\theta 1$ are respectively maximum value $\theta 1max=13°$ and minimum value $\theta 1min=5°$. By substituting these values and oscillation angle $\alpha=+35°$ in the equations (1) and (2), $\phi max$ and $\phi min$ shown in FIGS. 3B and 3C are determined as follows.

$$\phi max=35°-5°=30°$$

$$\phi min=35°-13°=22°$$

In addition, from these values for $\phi max$ and $\phi min$ as well as from the equations (3), $\phi ave$ is determined as follows.

$$\phi ave=(30°+22°)/2=26°$$

Therefore, according to the above consideration, the parting line of the 4-split sensor may be set at the position in a range of $\psi=45°$ and $\phi ave=26°$ and closer to the position of $\psi=45°$ than the position of $\phi ave=26°$. More specifically, because an intermediate angle between $\phi ave=26°$ and $+=45°$ is on the order of 35°, the sensor pattern of the HD photodetector 16 may be positioned so that the parting line of the 4-split sensor is positioned at about 40°, for example.

In the above description, the positioning of the parting line of the 4-split sensor is adjusted based on $\psi=45°$ and $\phi ave=26°$. However, the positioning of the parting line of the 4-split sensor may be adjusted based on $\psi=45°$ and one of $\phi max$ and $\phi min$ whose displacement to $\phi=45°$ is greater than the other.

Specifically, in the above example, the positioning of the parting line of the 4-split sensor is adjusted based on $\phi min=22°$ whose displacement to $\psi=45°$ is greater out of $\phi max=30°$ and $\phi min=22°$, as well as based on $\psi=45°$. With this adjustment, compared to the above case, the deterioration of the tracking error signal is somewhat suppressed, while the deterioration of the focus error signal is somewhat increased.

In this case, the parting line of the 4-split sensor may be set at the position in a range of $\psi=45°$ and $\phi ave=22°$ and closer to the position of $\psi=45°$ than the position of $\phi ave=22°$. More specifically, because an intermediate angle between $\phi ave=22°$ and $\psi=45°$ is on the order of 33°, the sensor pattern of the HD photodetector 16 may be positioned so that the parting line of the 4-split sensor is positioned, for example, at an angle slightly smaller than 40° (e.g., on the order of 38°).

Example of Verification

FIG. 13 shows a verification example (simulation) for the focus error signal and the tracking error signal generated when the normal misalignment Z for the HD objective lens 15 is set to Z=5 mm, and the oscillation angle α is set to α=+35°. The setting conditions and the vertical and the horizontal axes shown in FIG. 13 for results of the verification are the same as in the case of the verification in the above Example 1.

FIG. 13 shows verification results of a signal amplitude of the focus error signal (FE amplitude) and a signal amplitude of the tracking error signal (push-pull signal) (TE amplitude), when rotating a PP parting line shown in FIGS. 6A and 6C out of the parting lines of the 4-split sensor in directions moving closer to and away from the plane parallel to the disk surface, taking ψ=45° shown in FIG. 3A as a reference position (angle=0°).

In the drawing, a dashed line indicating the TE amplitude represents the TE amplitude when the track angle θ1 of the HD objective lens 15 takes minimum value θ1min=5° (i.e. when the HD objective lens 15 is positioned at the outermost circumference). Further, a solid line indicating the TE amplitude represents the TE amplitude when the track angle θ1 of the HD objective lens 15 takes maximum value θ1max=13° (i.e. when the HD objective lens 15 is positioned at the innermost circumference).

As described in the above consideration, a signal amplitude property of the focus error signal is rather steep compared to an amplitude property of the tracking error signal. From this drawing, it can be seen that the signal amplitude of the focus error signal deteriorates to a large extent if the PP parting line of the 4-split sensor displaced from the position of ψ=45°. On the other hand, the signal amplitude of the tracking error signal does not deteriorate that much even if the PP parting line of the 4-split sensor is displaced from the position of φave=26° (position of 19° in FIG. 13). Therefore, it can be seen that the signal amplitude of the tracking error signal does not deteriorate that much even if the PP parting line of the 4-split sensor is positioned closer to the position of ψ=45°.

By aligning the PP parting line of the 4-split sensor with the position of φave, the signal amplitude of the focus error signal deteriorates to around 82% of the maximum value (see the position pointed by an arrow B in FIG. 13). Further, by aligning the PP parting line of the 4-split sensor with the position of φmin, the signal amplitude of the focus error signal deteriorates to around 70% of the maximum value (see the position pointed by an arrow C in FIG. 13). In contrast, the signal amplitude of the tracking error signal is maintained at around 95% of the maximum value even when the PP parting line of the 4-split sensor is aligned with the position of ψ=45° (see the position pointed by an arrow A in FIG. 13). Therefore, it is possible to generate the tracking error signal at a proper level, even when the PP parting line of the 4-split sensor is aligned with the position of ψ=45°. At this time, because the focus error signal is at an ideal level, aligning the PP parting line of the 4-split sensor with the position of ψ=45° may set the tracking error signal at the proper level, while maintaining the focus error signal at the ideal level.

As described above, according to this example, by setting the PP parting line of the HD sensor 16 closer to the position of ψ=45° than an intermediate position of the position of ψ=45° and the position of φave, it is possible to make both of the focus error signal and the tracking error signal ideal without deterioration. At this time, even if the track angle θ1 varies as the HD objective lens moves, the amplitude of the tracking error signal may be maintained at the proper level. Thus, according to this example, it is possible to achieve the stable focus servo and the stable tracking servo.

Moreover, as examined in this example, it is possible to obtain the tracking error signal without too much deterioration even if the PP parting line of the HD sensor 16 is set at the position of ψ=45°. Accordingly, the PP parting line of the HD sensor 16 may be set at the position of ψ=45°, and whereby, the focus error signal may be maintained at the ideal level while suppressing the deterioration of the tracking error signal.

EXAMPLE 4

Figure 14:
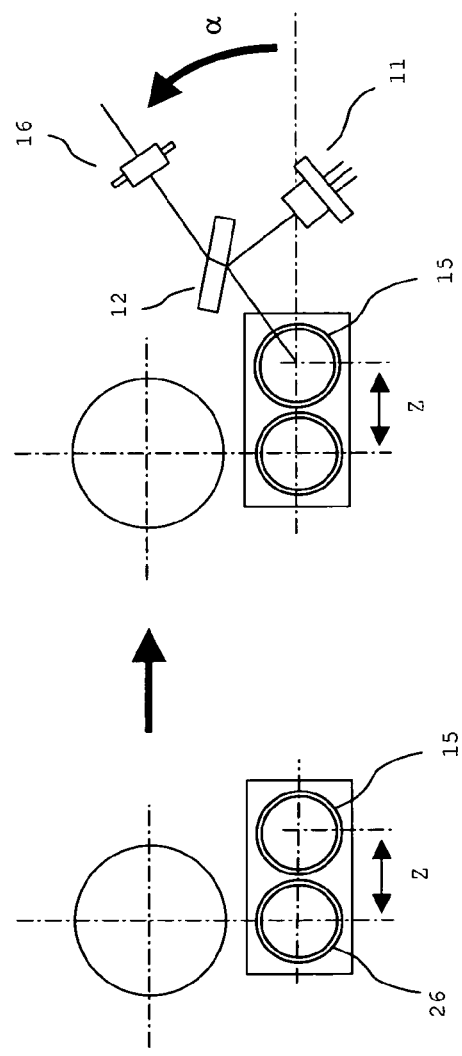
FIG. 14 is a view illustrating an optical system for an optical pickup according to examples 4 and 5 of the present invention.

The above Example 3, as shown in FIG. 14, describes the case in which the oscillation angle α is set toward the positive direction (counterclockwise direction). In contrast, as FIG. 15A, in a case in which the oscillation angle α is set toward the negative direction (clockwise direction), the position of the parting line of the 4-split sensor may be set based on φmax, φmin, and φave obtained by substituting the oscillation angle α with negative values in the equations (1), (2), and (3), and on ψ=−45°.

Figures 15A, 15B:
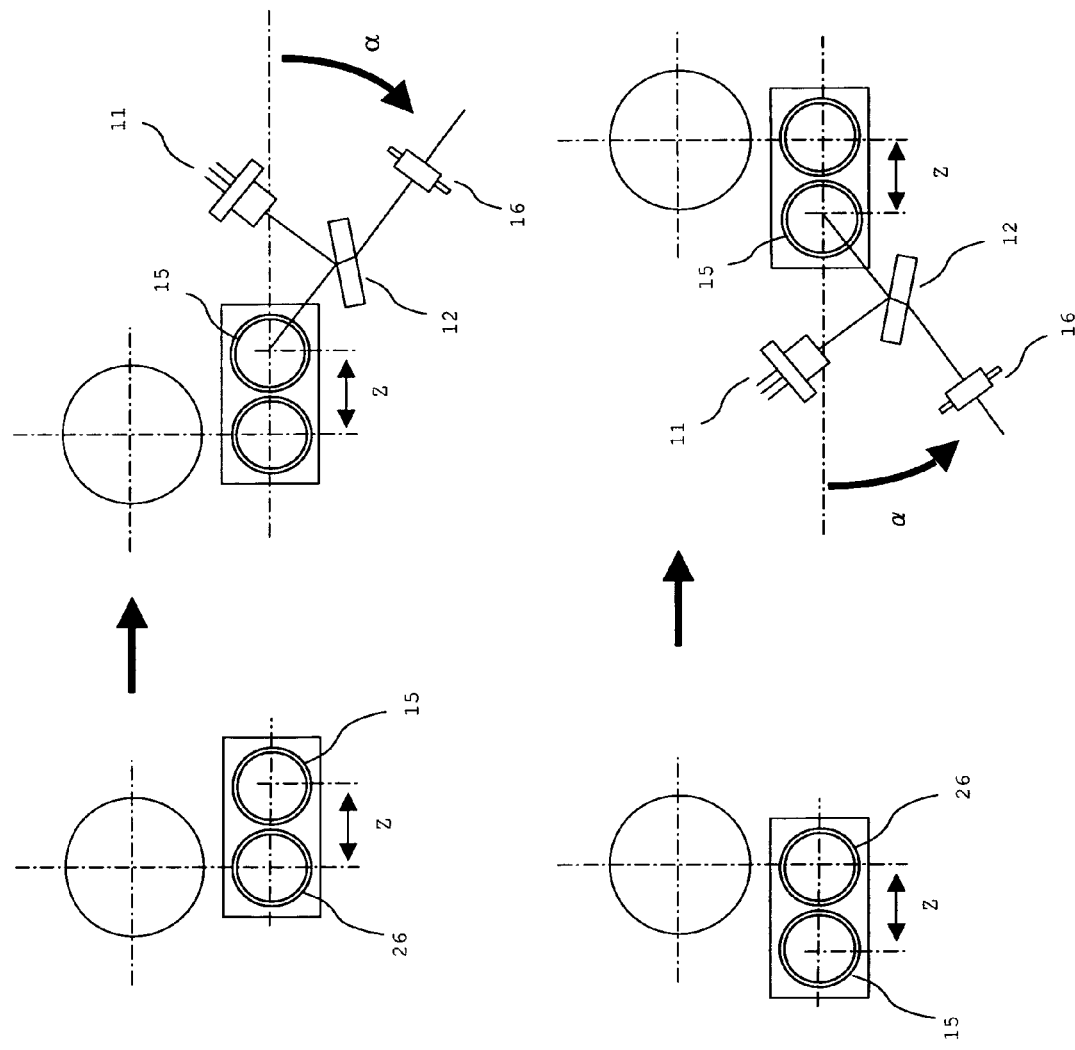
FIGS. 15A and 15B illustrate the optical system for the optical pickup according to the examples 4 and 5 of the present invention.

For example, in FIG. 15A, when the amount of the normal misalignment z is Z=5 mm (θ1max=13°, and θ1min=5°), and the oscillation angle α is α=−20°, φmax, φmin, and φave may be obtained as follows.

$$\phi max=-20°-5°=-25°$$

$$\phi min=-20°-13=-33°$$

$$\phi ave=-20°-(13°+5°)/2=-29°$$

In this case, the parting line of the 4-split sensor may be set at the position in a range of ψ=−45° and φave=−29° and closer to the position of ψ=−45° than the position of φave=−29°. More specifically, an intermediate angle between φave=−29° and ψ=−45° is on the order of −37°, and therefore, the sensor pattern of the HD photodetector 16 may be positioned so that the parting line of the 4-split sensor is at, for example, a position of an angle of −40° or slightly smaller than this (e.g., on the order of −42°).

Further, the position of the parting line of the 4-split sensor may be adjusted based on φmax=−25° whose displacement to ψ=−45° is greater out of φmax=−25° and φmin=−33°, as well as based on ψ=−45°. With this adjustment, compared to the above case in which φave=−29° and ψ=−45° are used, the deterioration of the tracking error signal is somewhat suppressed, while the deterioration of the focus error signal is somewhat increased.

In this case, the parting line of the 4-split sensor may be set at the position in a range of ψ=−45° and φmax=−25° and closer to the position of ψ=−45° than the position of φmax=−25°. More specifically, because an intermediate angle between φmax=−25° and ψ=−45° is on the order of −35°, the sensor pattern of the HD photodetector 16 may be positioned so that the parting line of the 4-split sensor is positioned at, for example, an angle of about −40°.

In this case, similarly to the verification in the above Example 3, it is assumed that it is possible to obtain the tracking error signal without too much deterioration even if the PP parting line of the HD sensor 16 is set at the position of ψ=−45°. Accordingly, the PP parting line of the HD sensor 16 may be set at the position of ψ=−45°, and whereby, the focus error signal may be maintained at the ideal level while suppressing the deterioration of the tracking error signal.

EXAMPLE 5

Further, as shown in FIG. 10B, in a case in which the HD objective lens 15 is positioned on the left of DVD objective lens 26 thereby causing the normal misalignment in the negative direction, the position of the parting line of the 4-split sensor may be set based on $\phi$max, $\phi$min, and $\phi$ave obtained by substituting the normal misalignment Z with negative values in the equations (1), (2), and (3), and on $\psi=45°$.

For example, in FIG. 15B, when the amount of the normal misalignment z is Z=−5 mm ($\theta$1max=−5°, and $\theta$1min=−13°), and the oscillation angle $\alpha$ is $\alpha=20°$, $\phi$max, $\phi$min, and $\phi$ave may be obtained as follows.

$$\phi max = 20° - (-13)° = 33°$$

$$\phi min = 20° - (-5)° = 25°$$

$$\phi ave = 20° - (-13° - 5°)/2 = 29°$$

In this case, the parting line of the 4-split sensor may be set at the position in a range of $\psi=45°$ and $\phi$ave=29° and closer to the position of $\psi=45°$ than the position of $\phi$ave=29°. More specifically, an intermediate angle between $\phi$ave=29° and $\psi=45°$ is on the order of 37°, and therefore, the sensor pattern of the HD photodetector 16 may be positioned so that the parting line of the 4-split sensor is at, for example, a position of an angle of 40° or slightly greater than this (e.g., on the order of 42°).

Further, the position of the parting line of the 4-split sensor may be adjusted based on $\phi$max=25° whose displacement to $\psi=45°$ is greater out of $\phi$max=33° and $\phi$min=25°, as well as based on $\psi=45°$. With this adjustment, compared to the above case in which $\phi$ave=29° and $\psi=45°$ are used, the deterioration of the tracking error signal is somewhat suppressed, while the deterioration of the focus error signal is somewhat increased.

In this case, the parting line of the 4-split sensor may be set at the position in a range of $\psi=45°$ and $\phi$ave=25° and closer to the position of $\psi=45°$ than the position of $\phi$ave=25°. More specifically, because an intermediate angle between $\phi$ave=25° and $\psi=45°$ is on the order of 35°, the sensor pattern of the HD photodetector 16 may be positioned so that the parting line of the 4-split sensor is positioned at, for example, an angle of about 40°.

In this case, similarly to the verification in the above Example 3, it is assumed that it is possible to obtain the tracking error signal without too much deterioration even if the PP parting line of the HD sensor 16 is set at the position of $\psi=45°$. Accordingly, the PP parting line of the HD sensor 16 may be set at the position of $\psi=45°$, and whereby, the focus error signal may be maintained at the ideal level while suppressing the deterioration of the tracking error signal.

Heretofore, the embodiment and the examples according to the present invention are described. However, the present invention is not limited by the embodiment and the examples as described above, and various other modifications may be possible.

For example, the case in which the normal misalignment occurs in the HD objective lens is described in the above embodiment and examples. However, the present invention may also be applied to a case in which the normal misalignment occurs in the DVD objective lens. Moreover, the present invention may also be applied to a case in which the normal misalignment occurs in both of the HD objective lens and the DVD objective lens.

Note that the present invention may also be applied to a case in which the normal misalignment does not occur in the objective lens, and only the oscillation angle $\alpha$ is different from ±45°. In this case, $\theta$1max=$\theta$1min=0 is substituted in the above equations (1), (2), and (3). At this time, the relation $\phi$ave=$\phi$min=$\phi$max=$\alpha$ is established. Therefore, the parting line of the 4-split sensor is adjusted based on $\psi=45°$ (or −45°) and $\phi$ave=$\phi$min=$\phi$max=$\alpha$, according to a method similar to the method described above.

In addition, the present invention may also be applied to a case in which the oscillation angle $\alpha$ is $\alpha=\pm45$ and the normal misalignment occurs in the objective lens, in the same manner as in the above examples.

Further, in the above embodiment and examples, the HD half mirror 12 is utilized. However, a polarizing mirror in a plate shape instead of the HD half mirror 12 may be employed. In this case, a polarizing film is formed on a surface into which the laser light from the HD laser 11 is incident out of two surfaces of the polarizing mirror. In addition, a $\lambda/4$ plate is disposed on an optical path from the polarizing mirror to the HD objective lens 15.

Moreover, in the above embodiment and examples, the collimating lens is provided for the optical system. However, the collimating lens may be omitted in a case in which the laser light is incident into the objective lens in a finite system.

In addition, in the above embodiment, the HD-DVD/DVD compatible optical pickup device and the HD-DVD/DVD compatible optical disk devices are illustrate by examples. However, the present invention may be applied to optical pickup and disk devices compatible to disks of a different type.

The embodiment of the present invention may adopt various modifications made accordingly within the technical idea and the sprit of the scope of the invention.

What is claimed is:

1. An optical pickup device, comprising:
   a semiconductor laser;
   a first objective lens that converges laser light outputted from the semiconductor laser on to a disk, and that is disposed at a position away from a diameter L of the disk by a distance z on a plane parallel to a surface of the disk, the diameter L being parallel to a moving direction of said optical pickup device;
   a photodetector that receives the laser light reflected from the disk, and that includes a sensor pattern divided into four regions by two parting lines orthogonally intersecting to each other; and
   an optical member in a plate shape that reflects the laser light outputted from the semiconductor laser to direct the laser light toward the first objective lens, and that transmits the laser light reflected from the disk to direct the laser light toward the photodetector, the optical member providing the reflected laser light with astigmatism so as to propagate in two planes, wherein
   in a case in which an oscillation angle a is formed in the plane parallel to the disk surface by the meeting of an optical axis of the laser light reflected by the optical member and directed toward the first objective lens with a line orthogonal to the disk diameter L and parallel to the disk surface, the oscillation angle a and the distance z are adjusted so that a track direction of the disk on the photodetector is positioned at substantially 45° to a cross-section of one plane of the reflected laser light, and one of the two parting lines of the sensor pattern is aligned with a line positioned at substantially 45° to the cross-section of the one plane of the reflected laser light.

2. The optical pickup device according to claim 1, wherein supposing that an angle formed by the meeting of a straight line connecting a center of the disk and an accessing position of the first objective lens with the diameter L is a track angle θ1, the oscillation angle a and the distance z are set so as to satisfy:

$$\alpha-(\theta 1max +\theta 1min)/2=\pm 45°$$

where θ1max is the track angle θ1 when the first objective lens is positioned at an innermost circumference of the disk, and θ1min is the track angle θ1 when the first objective lens is positioned at an outermost circumference of the disk.

3. The optical pickup device according to claim 2, further comprising:
a second objective lens that is different from the first objective lens, said second objective lens being disposed at a position along the disk diameter L.

4. The optical pickup device according to claim 3, further comprising:
an actuator that drives the objective lenses, the first objective lens and the second objective lens being mounted to a same actuator movable unit.

5. The optical pickup device according to claim 4, wherein
a second optical system is provided, the second optical system directing laser light toward the second objective lens and receiving said laser light reflected from the disk, the second optical system being different from a first optical system provided with the semiconductor laser, the photodetector, and the optical member.

6. The optical pickup device according to claim 5, wherein
the first optical system and the second optical system direct laser light having different wavelengths toward the disk, respectively, through the first objective lens and the second objective lens.

7. An optical pickup device, comprising:
a semiconductor laser;
an objective lens that converges laser light from the semiconductor laser onto a disk,
a photodetector that receives the laser light reflected from the disk, and that includes a sensor pattern divided into four regions by two parting lines orthogonally intersecting to each other; and
an optical member in a plate shape that reflects the laser light outputted from the semiconductor laser to direct the laser light toward the objective lens, and that transmits the laser light reflected from the disk to direct the laser light toward the photodetector, the optical member providing the reflected laser light with astigmatism so as to propagate in two planes, wherein
in a case in which a track direction of the disk on the photodetector is positioned at an angle other than 45° to a cross-section of one plane of the reflected laser light, the sensor pattern is positioned so that one of the two parting lines of the sensor pattern becomes closer to a second direction than a first direction, the first direction aligning with the track direction, the second direction being at 45° to the cross-section of the one plane of the reflected laser light.

8. The optical pickup device according to claim 7, wherein
the sensor pattern is positioned so that one of the two parting lines of the sensor pattern aligns with the second direction.

9. The optical pickup device according to one of claims 7 and 8, wherein
the objective lens is disposed at a position away from a diameter L of the disk by a distance z on a plane parallel to a surface of the disk, the diameter L being parallel to a moving direction of said optical pickup device, and
the positioning of the sensor pattern is adjusted by taking, as the first direction, a direction toward a center of a displacement range of the track direction on the photodetector when said optical pickup device moves between an innermost circumference of the disk and an outermost circumference of the disk.

10. A method of laying out an optical pickup device configured to generate a focus error signal based on an astigmatism method and a tracking error signal based on a push-pull method, the device being provided with a photodetector having a sensor pattern divided into four regions by two parting lines that orthogonally intersect to each other, the method comprising the steps of:
placing an optical member in a plate shape to reflect a laser light outputted from a semiconductor laser to direct the laser light toward an objective lens, and transmit the laser light reflected from a recording medium to direct the laser light toward the photodetector, the optical member providing the reflected laser light with astigmatism so as to propagate in two planes; and
in a case in which a track direction of the recording medium projected onto the photodetector is positioned at an angle other than 45° to a cross-section of one plane of the reflected laser light, positioning the sensor pattern so that one of the two parting lines of the sensor pattern becomes closer to a second direction than a first direction, the first direction aligning with the track direction, the second direction being at 45° to the cross-section of the one plane of the reflected laser light.

11. The method of laying out according to claim 10, wherein
the sensor pattern is positioned so that one of the two parting lines of the sensor pattern aligns with the second direction.

12. The method of laying out according to one of claims 10 and 11, wherein
the recording medium is constituted by a disk having one of a spiral track and a concentric track, and
in a case in which the objective lens mounted to the optical pickup device is disposed at a position away from a diameter L of the disk by a distance z on a plane parallel to a surface of the disk, the diameter L being parallel to a moving direction of said optical pickup device,
the positioning of the sensor pattern is adjusted by taking, as the first direction, a direction toward a center of a displacement range of the track direction on the photodetector when said optical pickup device moves between an innermost circumference of the disk and an outermost circumference of the disk.

* * * * *